United States Patent
Pruzan et al.

(10) Patent No.: US 7,149,206 B2
(45) Date of Patent: Dec. 12, 2006

(54) SYSTEM AND METHOD FOR MANAGING WIRELESS VEHICULAR COMMUNICATIONS

(75) Inventors: Brian M. Pruzan, Carmel, IN (US); Peter A. Thayer, Noblesville, IN (US); Steven J. Enyart, Kokomo, IN (US); Paul S. Phillips, Westfield, IN (US); Leonid Shlayen, Huntingdon Valley, PA (US); Timothy A. Hans, Noblesville, IN (US)

(73) Assignee: Electronic Data Systems Corporation, Plano, TX (US)

( * ) Notice: Subject to any disclaimer, the term of this patent is extended or adjusted under 35 U.S.C. 154(b) by 980 days.

(21) Appl. No.: 10/072,121

(22) Filed: Feb. 8, 2002

(65) Prior Publication Data

US 2002/0110146 A1    Aug. 15, 2002

Related U.S. Application Data

(63) Continuation-in-part of application No. 10/025,332, filed on Dec. 18, 2001, now Pat. No. 6,728,603.

(60) Provisional application No. 60/268,254, filed on Feb. 8, 2001.

(51) Int. Cl.
*H04Q 7/20* (2006.01)
(52) U.S. Cl. ............... 370/349; 340/438; 701/33
(58) Field of Classification Search ........... 370/349, 370/473; 340/438; 701/29, 33
See application file for complete search history.

(56) References Cited

U.S. PATENT DOCUMENTS

| 6,603,394 | B1 * | 8/2003 | Raichle et al. ............ 340/438 |
| 2002/0197955 | A1 * | 12/2002 | Witkowski et al. ......... 455/41 |
| 2004/0249526 | A1 * | 12/2004 | Hauer et al. .............. 701/29 |

FOREIGN PATENT DOCUMENTS

| DE | 19728083 A1 | 2/1999 |
| WO | WO 00/72463 A2 | 11/2000 |

OTHER PUBLICATIONS

Haartsen et al., 'Bluetooth—A New Low-Power Radio Interface Providing Short-Range Connectivity', IEEE Proceedings of the IEEE, vol. 88, No. 10, Oct. 2000, pp. 1651-1661.*
Annex to Form PCT/ISA/206 Communication Relating to the Results of the Patent International Search, 2 pages.

* cited by examiner

*Primary Examiner*—Melvin Marcelo
(74) *Attorney, Agent, or Firm*—Baker Botts L.L.P.

(57) ABSTRACT

A system and method for managing wireless vehicular communications include a system and method for vehicle protocol conversion. The system and method for vehicle protocol conversion have the ability to receive messages through a vehicle bus connector according to a vehicle bus protocol, analyze the messages to determine whether they should be transmitted, and transmit the messages over a wireless link if they should be transmitted.

18 Claims, 9 Drawing Sheets

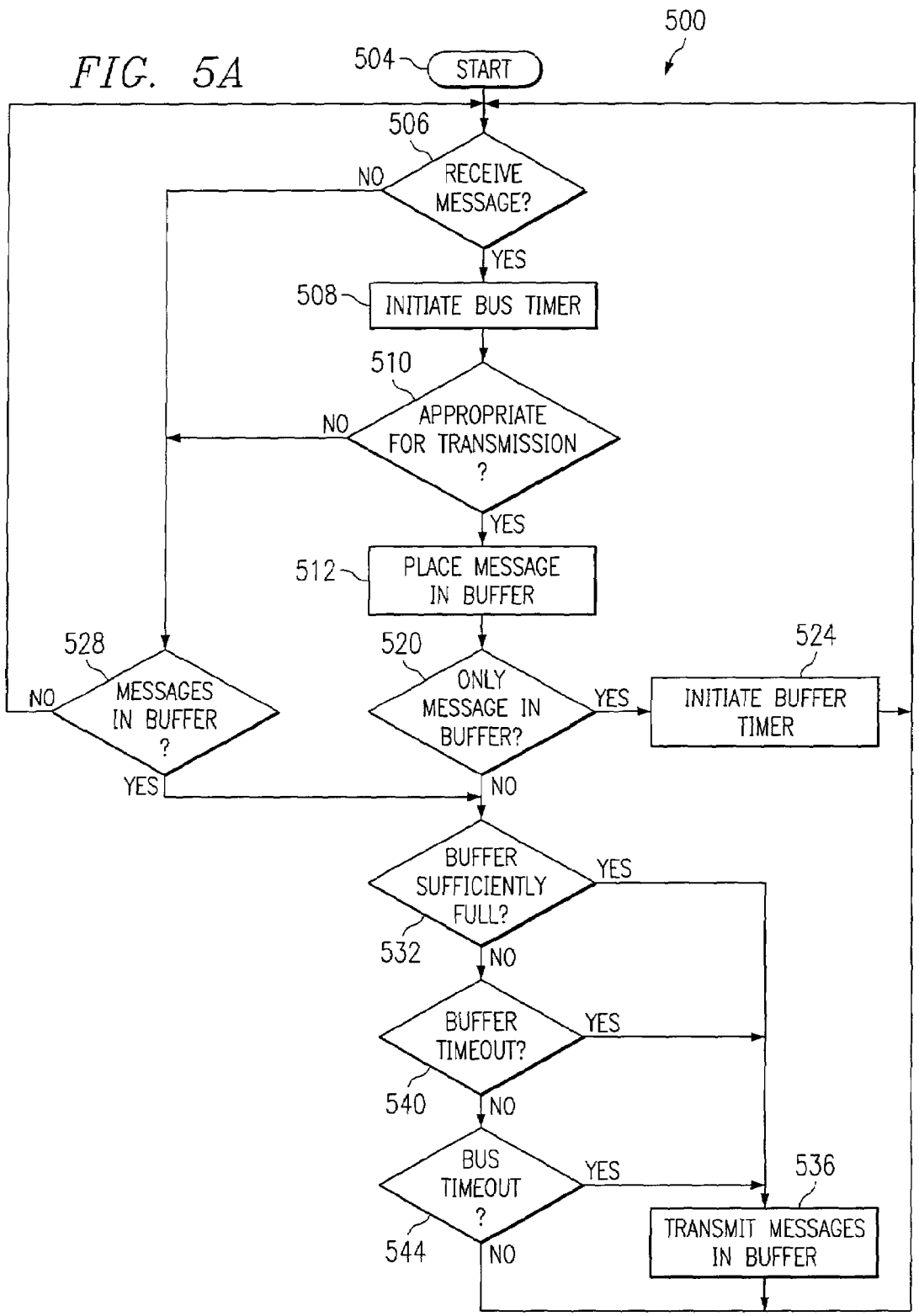

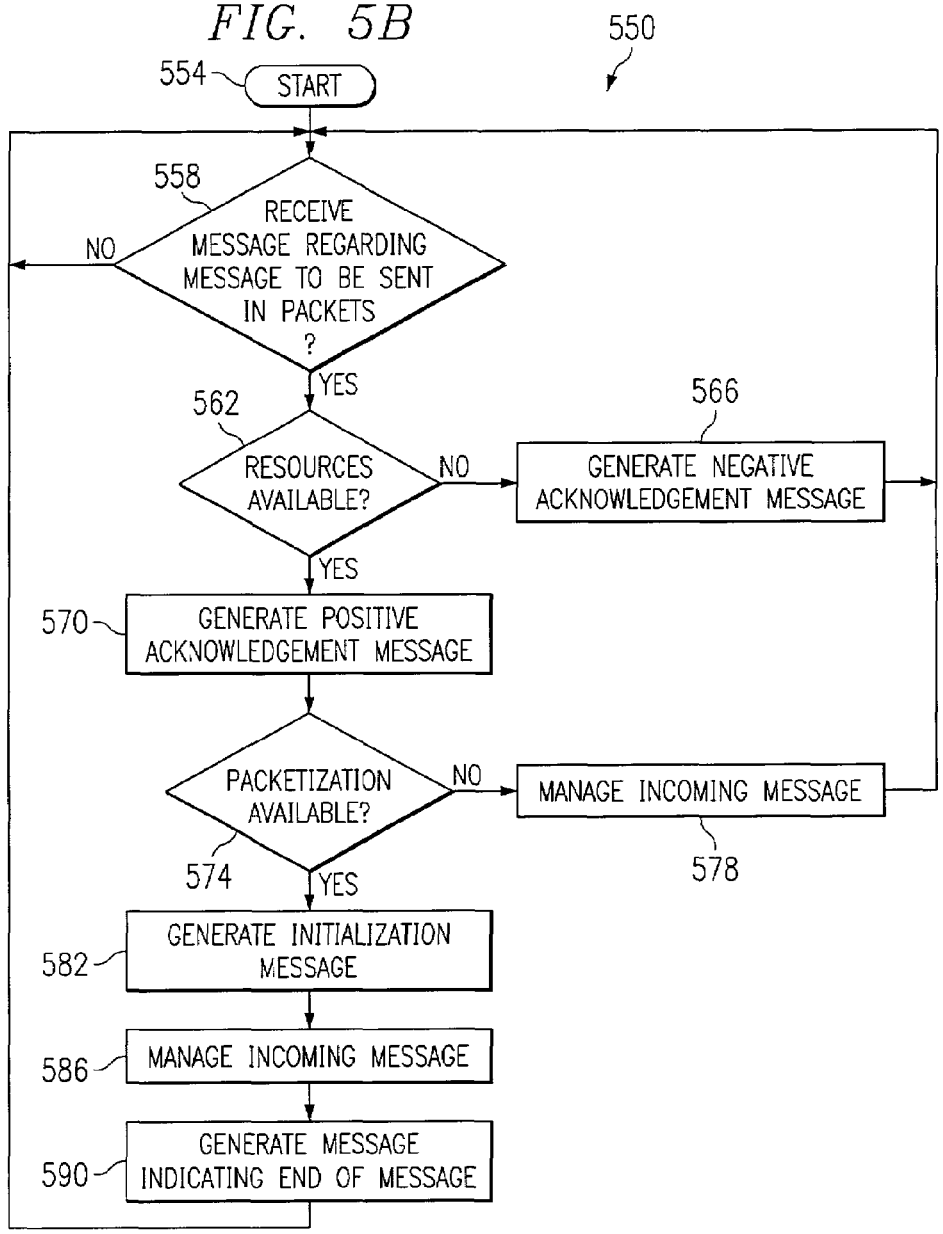

SYSTEM AND METHOD FOR MANAGING WIRELESS VEHICULAR COMMUNICATIONS

RELATED APPLICATIONS

This application is a continuation-in-part of U.S. patent application Ser. No. 10/025,332, filed Dec. 18, 2001, entitled System and Method for Managing Wireless Vehicular Communications, now U.S. Pat. No. 6,728,603 B2 and claims the benefit of U.S. Provisional Application Ser. No. 60/268,254, filed Feb. 8, 2001, entitled Apparatus and Method for Vehicle Protocol Conversion.

TECHNICAL FIELD OF THE INVENTION

This invention relates to wireless communication systems and, in particular, to a system and method for managing wireless vehicular communications.

BACKGROUND OF THE INVENTION

Electronic controllers are currently being used to control a variety of components on vehicles, such as, for example, the engine, the transmission, and/or the brakes. When operating properly, these controllers enhance a vehicle's performance and/or safety.

In operation, the controllers often need to exchange data with each other regarding their and/or the vehicle's status. To exchange this data, the controllers usually use a bus, which is typically a wire or group of wires, to convey electrical signals that represent data. Thus, being able to monitor the signals on the bus is beneficial because the operational status of the controllers and/or the vehicle may be deduced. Furthermore, because many electronic controllers may be interrogated and/or controlled, being able to insert messages onto the bus is beneficial.

Unfortunately, typical devices that monitor and/or insert messages on a vehicle bus, such as, for example, a diagnostic computer, usually require a direct connection to the vehicle bus. Thus, each time one of these devices is used to monitor and/or insert messages on the vehicle bus, it must be connected to the bus, which increases set-up time and cost. Moreover, the connector in the vehicle may become damaged by repeated connections. Additionally, many of these devices tend to be rather large and, hence, are not very portable. Thus, the vehicle may have to be moved to be connected to the device, further increasing time and cost. Furthermore, because different devices are used for different functions, the vehicle may have to be moved several times to allow each device to monitor and/or insert messages on the bus, further increasing time and cost.

SUMMARY OF THE INVENTION

The present invention substantially reduces and/or eliminates at least some of the problems and disadvantages associated with previously developed systems and methods for communicating messages on a vehicle bus. Accordingly, the present invention provides a system and method that manage the wireless communication of messages between a vehicle bus and a remote system.

In particular embodiments, a system for vehicle protocol conversion includes a bus connector, a protocol transceiver, a computer, and a wireless communication device. The bus connector is adapted to be coupled to a vehicle bus, and the protocol transceiver is coupled to the bus connector. The protocol transceiver is operable to receive messages destined for communication through the bus connector and send the messages through the bus connector according to a vehicle bus protocol and to receive messages through the bus connector according to the vehicle bus protocol. The computer is coupled to the protocol transceiver and is operable to analyze the messages received through the bus connector to determine whether they should be transmitted and to receive the messages destined for communication through the bus connector. The wireless communication device is coupled to the computer and, using a wireless link, is operable to transmit the messages that should be transmitted and receive the messages destined for communication through the bus connector.

In some embodiments, a method for vehicle protocol conversion includes receiving messages through a vehicle bus connector according to a vehicle bus protocol and analyzing the messages to determine whether they should be transmitted. The method also includes transmitting the messages over a wireless link if they should be transmitted.

The present invention provides several technical features. For example, in certain embodiments, a device that desires to monitor and/or insert messages on a vehicle bus does not have to be physically connected to the bus, decreasing time and cost. Additionally, for devices that are not portable, the vehicle may not have to be moved in order for the device to be able to monitor and/or insert messages on the bus, also decreasing service time and cost. Furthermore, different devices may monitor and/or insert messages on the bus without having to individually connect each of them to the bus. Thus, the vehicle may not have to be connected and/or moved to several different devices if they need to communicate with the bus, additionally reducing time and cost. As another example, in particular embodiments, the wireless communication format between the device and the bus accommodates all of the data rates on the bus. Thus, the messages on the bus can be timely communicated to the device, although there may still be some latency. As a further example, in some embodiments, the messages on the vehicle bus are filtered before being transmitted to the device. Thus, the device does not have to consume resources on extraneous messages, and the bandwidth of the wireless link between the bus and the device is conserved. As an additional example, in certain embodiments, messages in a variety of different vehicle bus protocols may be communicated to and/or from the device. Thus, a variety of types of devices may receive messages from a vehicle bus and/or a device may communicate with controllers that use different protocols. As a further example, in some embodiments, a user interface is generated to assist a user in managing the wireless communication of messages between the vehicle and the device. As still another example, in certain embodiments a device may manage the communications between a bus and multiple applications being run on the device.

Particular embodiments may possess none, one, some, or all of these technical features and/or additional technical features. Other technical features will be readily apparent to one skilled in the art from the following figures, description, and claims.

BRIEF DESCRIPTION OF THE DRAWINGS

The following drawings provide a more complete understanding of the present invention, especially when considered in conjunction with the following detailed description, and also illustrate its technical features:

FIGS. 5A–5B are flowcharts illustrating methods for managing messages to be transmitted over a wireless link by a protocol converter in accordance with certain embodiments the present invention;

DETAILED DESCRIPTION OF THE INVENTION

Figure 1:
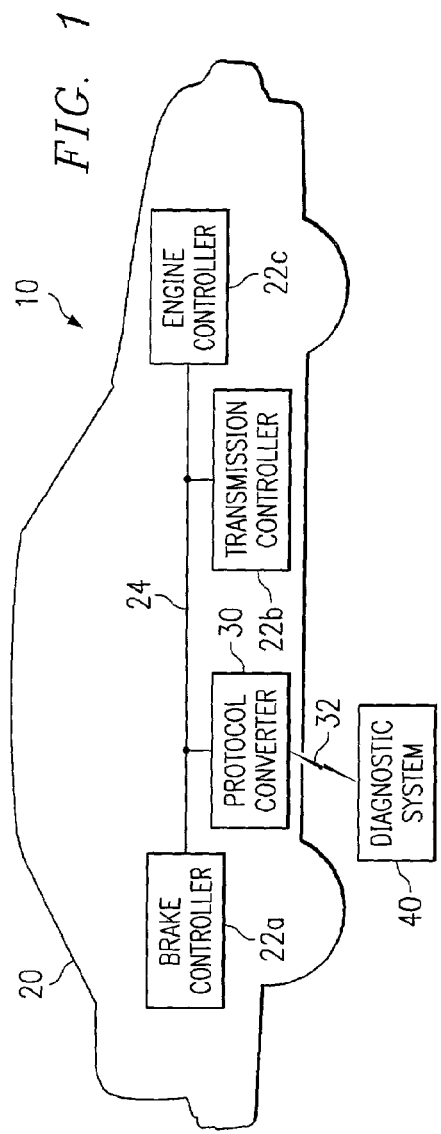
FIG. 1 illustrates a system for managing wireless vehicular communication in accordance with one embodiment of the present invention.

FIG. 1 illustrates a system 10 for managing wireless vehicular communications in accordance with one embodiment of the present invention. As illustrated, system 10 includes a vehicle 20, a protocol converter 30, and a diagnostic system 40. Vehicle 20 includes a variety of controllers 22, such as brake controller 22a, transmission controller 22b, and engine controller 22c, each controlling and/or monitoring a component of vehicle 20. Controllers 22 are coupled to each other by a vehicle bus 24. Bus 24 has different portions, which may themselves be buses, and each of controllers 22 may communicate over one or more of the portions. Protocol converter 30 is also coupled to bus 24, and, in general, facilitates communication between controllers 22 and/or bus 24 of vehicle 20 and diagnostic system 40. Diagnostic system 40, which is one type of remote system that desires to communicate with controllers 22 and/or monitor messages on bus 24, is coupled to protocol converter 30 by a wireless link 32.

In operation, controllers 22 exchange a variety of messages, represented by electrical signals, over bus 24. These messages may contain data regarding the controllers and/or the vehicle. Protocol converter 30, by virtue of being coupled to bus 24, is able to receive the electrical signals on bus 24 and also to insert electrical signals representing messages onto bus 24. Additionally, by virtue of wireless link 32, protocol converter 30 is able to exchange messages with diagnostic system 40. Furthermore, protocol converter 30 is able to convert the messages on bus 24 into an appropriate format for transmission over wireless link 32 and to convert messages received over wireless link 32 into an appropriate format for communication on bus 24. Thus, protocol converter 30 allows diagnostic system 40 to "listen" to the messages on bus 24, send messages to the controllers 22, and/or receive messages from controllers 22. Diagnostic system 40 may display messages received from the bus, analyze messages received from the bus to diagnose problems with one of controllers 32 and/or vehicle 20, receive and transmit user input messages for one of controllers 22, and/or generate and transmit messages for one of controllers 22. For security, protocol converter 30 may encrypt the messages before transmitting them to diagnostic system 40 by using any of a variety of well known encryption algorithms.

In particular embodiments, protocol converter 30 analyzes the messages received from bus 24 and/or diagnostic system 40 to determine whether to convey the messages. For example, protocol converter 30 may analyze a message received from bus 24 to determine whether it is for diagnostic system 40 and, if it is not, refuse to transmit the message. A message may be for diagnostic system 40 if, for instance, it is directed to an address claimed for the diagnostic system. As another example, protocol converter 30 may examine a message received from bus 24 to determine whether it satisfies certain criteria, which could be established by diagnostic system 40. The criteria could include which of controllers 22 originated the message, which of controllers 22 is to receive the message, the contents of the message, the priority of the message, the bus protocol of the message, and/or any other appropriate type of criteria. Protocol converter 30 could refuse to transmit the message if it does not satisfy the specified criteria. Note that if no criteria was specified, protocol converter 30 may or may not transmit the messages on bus 24. As a further example, protocol converter 30 may analyze a message received over wireless link 32 to determine whether it is destined for bus 24. If the message is not destined for bus 24, possibly being a command for protocol converter 30, protocol converter 30 may refuse to convey the message to bus 24. Furthermore, protocol converter 30 may analyze the message to determine whether it is valid before communicating it to bus 24, providing additional filtering of the message. Thus, at least in these embodiments, protocol converter 30 acts as a filter for messages from and/or to bus 24.

In certain embodiments, controllers 22 of vehicle 20 use a variety of different protocols, such as, for example, CAN 2.0B/J1939, J1708/J1587, Class 2B/J1850, or a proprietary protocol, to communicate messages over bus 24. In these embodiments, protocol converter 30 may be able to convert messages in a variety of protocols on bus 24 into an appropriate format for communication over wireless link 32 to diagnostic system 40. Protocol converter 30 may additionally be able to analyze a message received over wireless link 32 to determine which vehicle bus protocol to use to insert the message onto bus 24. Thus, protocol converter 30 is able to facilitate the exchange of messages between a variety of vehicle bus protocols and diagnostic system 40. Additionally, protocol converter 30 may determine if the portion of bus 24 for which the message is destined is active. If the portion is not active, protocol converter 30 may refuse to convey the message, providing additional filtering of messages to bus 24. In particular embodiments, protocol converter 30 is able to facilitate the exchange of messages between a variety of vehicle bus protocols and a variety of remote systems and/or a variety of vehicle bus protocols and a variety of applications being run on a remote system.

The protocol or protocols used on bus 24 may be considered when establishing wireless link 32, so that it has appropriate bandwidth for sending messages from and receiving messages for bus 24. Typically, it may be beneficial if the capacity of wireless link 32 is greater than the combination of data rates on bus 24. For example, J1939 messages are specified to be communicated at 250 kilobits per second (Kbps), and J1708 messages are specified to be communicated at 9.6 Kbps. Thus, if J1939 and J1708 messages are used on the bus 24, a capacity of at least several hundred Kbps may be appropriate for wireless link 32. One type of wireless link capable of handling such rates is one that operates according to the Bluetooth™ protocol, because it should allow communication at 700 Kbps over an asynchronous link. Note, however, that the radio frequency (RF) and control overhead messages in Bluetooth™ may consume a substantial portion of this bandwidth.

The components of system 10 may have a variety of configurations. For example, vehicle 20 may be a car, a bus, a truck, or any other type of transportation device having controllers. Controllers 22 of vehicle 20 may include microprocessors, microcontrollers, application specific integrated circuits (ASICs), field-programmable gate arrays (FPGAs), atomic computers, biological computers, or any other type of logical device for controlling and/or monitoring a function and/or component of vehicle 20. In particular embodiments, controllers 22 may include temperature sensors, rate sensors, distance sensors, and/or any other appropriate sensing device. Moreover, in some embodiments, sensors may be coupled to bus 24. Note that vehicle 20 may have any number of controllers 22. Bus 24 of vehicle 20 may include a Controller Area Network (CAN) bus, a J1708 bus, or any other collection of wireline or wireless links that are able to convey messages between controllers 22. Any of a variety of protocols may be used to send signals over bus 24, such as, for example, CAN, Class II, or J1708. In particular embodiments, however, bus 24 only handles one protocol. Protocol converter 30 may be any type of device that can facilitate the exchange of vehicle bus messages between diagnostic system 40 and bus 24 over wireless link 32. In particular embodiments, protocol converter implements the Bluetooth™ protocol to transmit/receive vehicle bus messages over wireless link 32. Diagnostic system 40 may be a personal computer (PC), a personal digital assistant (PDA), a work station, or any other type of logical device that can communicate vehicle bus messages over wireless link 32. Diagnostic system 40, which is one type of remote system, may include microprocessors, microcontrollers, ASICs, FPGAs, atomic computers, biological computers, or any other type of device for manipulating data in a logical manner. Note that diagnostic system 40 may be located internally or externally to vehicle 20. In certain embodiments, diagnostic system 40 may be a diagnostic computer that communicates with protocol converter 30 using the Bluetooth™ protocol over wireless link 32.

Protocol converter 30 provides a variety of technical features to system 10. For example, protocol converter 30 allows diagnostic system 40 to receive messages from and/or insert messages onto bus 24 of vehicle 20 without having to be physically connected to bus 24. Thus, diagnostic system 40 does not have to be connected to vehicle 20 when maintenance needs to be performed, reducing service time and cost. Additionally, this capability may allow diagnostic system 40 to communicate with controllers 22 without having to move vehicle 20, also reducing service time and cost. Furthermore, a variety of diagnostic systems may monitor and/or insert messages on bus 24 without each having to be connected to bus 24, additionally reducing service time and cost. Moreover, protocol converter 30 may be useful for remotely programming a controller during manufacturing or use of vehicle 20, also reducing time and cost. As another example, because protocol converter 30, at least in certain embodiments, handles a variety of vehicle bus protocols on bus 24, protocol converter 30 is useful for a variety of different vehicle types, controllers, and/or diagnostic systems. Thus, a separate protocol converter is not required for each vehicle, controller, and/or diagnostic system combination. As a further example, at least in some embodiments, protocol converter 30 is able to filter the messages from bus 24 so that diagnostic system 40 does not have to consume resources on extraneous messages and the bandwidth of wireless 32 link is conserved. As still a further example, protocol converter 30 may use a wireless link that is able to handle the combined data rates on vehicle bus 24. Thus, the messages on bus 24 may be communicated to diagnostic system 40 in a timely manner. Note, however, as will be discussed in more detail below, that, in some embodiments, bus messages may still experience some latency due to the fact that they are stored for a period of time before they are sent. A variety of other technical features will be readily apparent to one skilled in the art.

Figure 2:
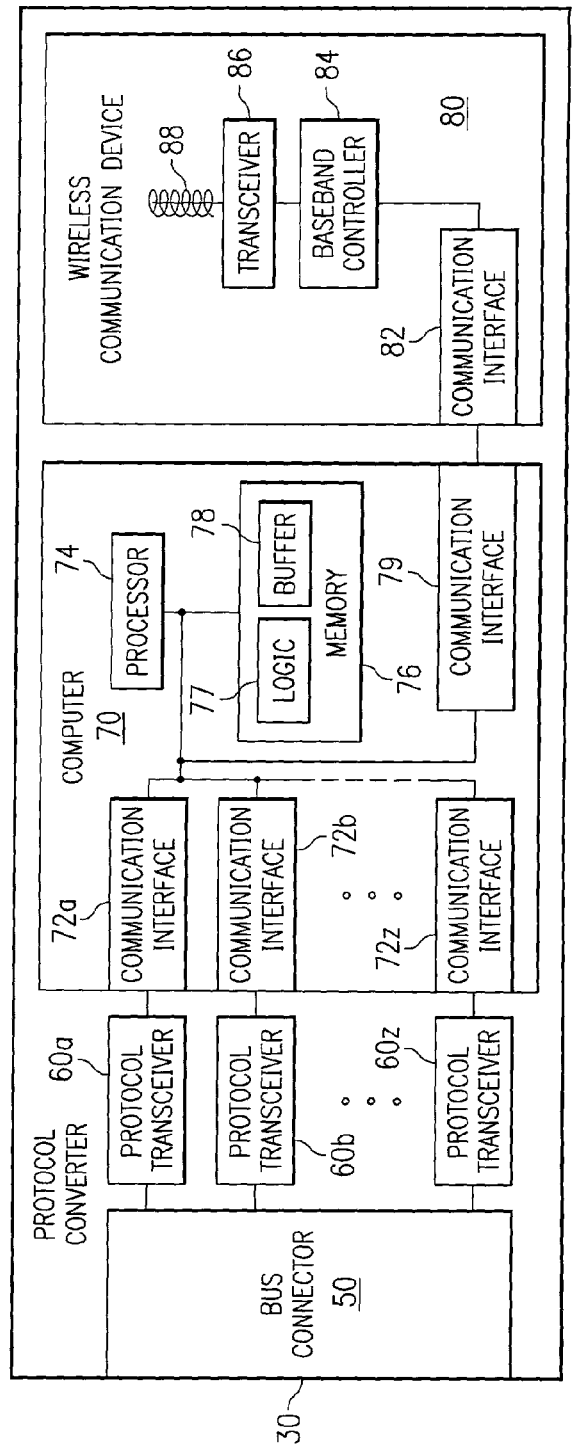
FIG. 2 illustrates one embodiment of a protocol converter in accordance with the present invention.

FIG. 2 illustrates one embodiment of protocol converter 30 for system 10. In this embodiment, protocol converter 30 includes a bus connector 50, a plurality of protocol transceivers 60, a computer 70, and a wireless communication device 80. Bus connector 50, which is operable to convey signals to and from bus 24, is adapted to couple to bus 24 and is coupled to protocol transceivers 60. Protocol transceivers 60, which are operable, through bus connector 24, to receive electrical signals from bus 24 and send electrical signals to bus 24, are each coupled to one of communication interfaces 72 of computer 70. Computer 70 also includes a processor 74, which is operable to analyze and send messages to and from bus 24, a memory 76, which is operable to store vehicle bus messages in a buffer 78 and a set of logic 77 for processor 74, and a second communication interface 79. Communication interface 79 is coupled to a communication interface 82 of wireless communication device 80. Wireless communication device 80 also includes a baseband controller 84, a transceiver 86, and an antenna 88, which together transmit and receive messages relating to bus 24.

In operation, protocol converter 30 receives electrical signals representing messages from bus 24 through bus connector 50 and transmits the messages to diagnostic system 40 through wireless communication device 80. In addition, protocol converter 30 receives messages from diagnostic system 40 through wireless communication device 80 and sends electrical signals representing the messages to bus 24 through bus connector 50. Protocol converter 30 also receives messages from diagnostic system 40 that are destined for the protocol converter itself and generates and transmits messages that are destined for diagnostic system 40.

For the transfer of messages from bus 24 to diagnostic system 40, when a message is sent over bus 24, bus connector 50 receives the electrical signals representing the message and conveys them to the appropriate one of protocol transceivers 60, each protocol transceiver 60 handling a different protocol used on bus 24. Upon receiving the electrical signals from bus connector 50, the protocol transceiver converts the signals into a format appropriate for computer 70. The protocol transceivers may perform detection, filtering, error correction, analog to digital conversion, protocol conversion, and/or any of a variety of other operations to convert the signals into the appropriate format. Note that the protocol transceivers may receive and send messages at different rates. For example, J1939 messages may be sent/received at 250 Kbps, and J1708 messages may be sent/received at 9.6 Kbps. Note also that communication interfaces 72 may be responsible for performing some of these operations. Upon detecting a message, processor 74, according to logic 77, examines the message to determine it should be transmitted to diagnostic system 40. For example, processor 74 may determine that the message is not destined for diagnostic system 40, possibly being destined for computer 70 or another of controllers 22, or not appropriate for diagnostic system 40, possibly because it does not meet criteria defined by diagnostic system 40. If the message is destined and/or appropriate for diagnostic system 40, processor 74 formats the message for diagnostic system 40 and for communication to wireless communication device 80 and sends the message to wireless communication device 80 through communication interface 79. Note that control information may also be exchanged between wireless communication device 80 and computer 70. Communication interface 82 of wireless communication device 80 conveys the message to baseband controller 84. Baseband controller 84 converts the message into an appropriate format for transmission over wireless link 32, such as, for example, by determining a modulation sequence based on the message and providing appropriate packaging for the message. Transceiver 86, based on the converted message, transmits electromagnetic signals representing the converted message using antenna 88. Transceiver 86 may accomplish this by frequency modulating a carrier signal based on the converted message, by amplitude modulating a carrier signal based on the converted message, or by using any other appropriate technique for transmitting data over a wireless link.

On the other hand, when wireless communication device 80 receives signals representing a message through antenna 88, transceiver 86 performs the initial steps in processing the signals, such as, for example, removing the carrier frequency, and sends the signals to baseband controller 84. The message may be in a wireless communication format and may have been transmitted by diagnostic system 40. Baseband controller 84 converts the signals from the format used for wireless link 32 to one appropriate for computer 70, such as, for example, by determining data based on a modulation sequence. Baseband controller 84 may also perform additional processing on the message, such as, for example, error correction, security validation, and delivery assurance. Moreover, baseband controller 84 may handle other aspects of the wireless link, such as, for example, channel hopping. For embodiments in which wireless communication device 80 implements the Bluetooth™ protocol, baseband controller 84 typically implements certain layers of the Bluetooth™ stack, such as, for example, Logical Link Control and Adaptation Protocol (L2CAP) or Host Controller Interface (HCI). Baseband controller 84 may, of course, perform similar formations for transmission operations. The message may then be sent to or retrieved by computer 70 through communication interface 82 and communication interface 79. When the message arrives at computer 70, processor 74 analyzes the message. For example, processor 74 may determine whether the message is for processor 74, for one of controllers 22, and/or for an active portion of bus 24. If it is not, processor 74 would probably discard the message. Processor 74 may determine whether the message is for one of controllers 22 by examining the destination address of the message, the protocol of the message, a flag in the message, or any other appropriate type of indicator. Processor 74 may also perform a security check to validate the message. If processor 74 determines that the message is for one of controllers 22 or an active portion of bus 24 and is valid, processor 74 formats the message for bus 24, selects the appropriate one of protocol transceivers 60, and sends the message to the selected protocol transceiver 60 through the associated communication interface 72. Upon receiving the message from the associated communication interface, the selected protocol transceiver, based on the message, generates electrical signals according to a vehicle bus protocol for communication over bus 24 and sends the signals to bus connector 50, which conveys the signals to bus 24.

When processor 74 is determining whether a message from bus 24 is appropriate for diagnostic system 40, processor 74 could examine the message based on its origination address, destination address, protocol, priority, content, and/or other appropriate factor to decide whether to send the message to wireless communication device 80 for transmission to diagnostic system 40. Diagnostic system 40 may instruct processor 74 as to what type or types of messages to transmit. For example, diagnostic system 40 may be interested in messages originating from a particular one of controllers 22, destined for a particular one of controllers 22, having a particular priority, using a particular protocol, and/or containing a particular type of content, which may include engine condition, brake condition, transmission condition, or any other appropriate type of vehicular information. Using such filtering could be useful, for example, when protocol converter 30 is receiving a large number of messages on bus 24, but diagnostic system 40 only wishes to receive messages of a certain type.

In some embodiments, computer 80 may be able to implement multiple filters for bus 24. This could be useful if diagnostic system 40 is performing multiple tasks, which could be different parts of an application or different applications, that require different types of messages from bus 24, for example. Computer 70 could manage the filters, for example, by receiving an identifier for each from diagnostic system 40 and sending the identifier along with the filtered messages so that diagnostic system 40 knows to which task the data belongs. In particular embodiments, however, computer 80 could just send the data and allow diagnostic system 40 determine to which task it belongs.

In certain embodiments, protocol converter 30 may store data for extended periods of time before transmitting it to diagnostic system 40. For example, memory 76 of computer 70 may store a variety of messages that protocol converter 30 has received from bus 24 while diagnostic system 40 has not been in communication with protocol converter 30. Then, upon establishment of communication link 32 to diagnostic system 40, protocol converter 30 may transmit the stored messages to diagnostic system 40 through wireless communication device 80. As another example, memory 76 may store information regarding vehicle 20, such as, for example, the vehicle identification number (VIN) and/or service history. This information may also be transmitted to diagnostic system 40 through wireless communication device 80. As a further example, computer 70 may store messages that are small relative to the bandwidth of wireless link 32 and then send such messages together in a group. This may allow better utilization of wireless link 32, especially if it is a synchronous link. In general, a variety of other types of information may be stored by protocol converter 30 for later transmission to diagnostic system 40. Note that the transmission of the information may be initiated by protocol converter 30 and/or diagnostic system 40. Also note that computer 70 may transmit messages concerning its own status to diagnostic system 40.

Furthermore, protocol converter 30 may store information regarding the initiation of communication with remote systems, such as, for example, diagnostic system 40. For example, protocol converter 30 may store a list of addresses for approved remote systems and/or a list of passcodes that approved remote systems should send. As another example, the protocol converter 30 may store a list of channels that should be scanned to search for an initiation signal from a remote system. A variety of other communication initiation information well known to those skilled in the art may also be stored.

In some embodiments, computer 70 may be operable to emulate the functions of a node on bus 24. For example, computer 70 may be able to perform dynamic address configuration, in which it negotiates and claims an address on bus 24 on behalf of diagnostic system 40. In particular embodiments, computer 70 may be able to claim multiple addresses on bus 24. In some of these embodiments, computer 70 may be able to implement different filtering requirements for each address. Computer 70 may also be able to respond to state of health inquiries from the other devices on the bus. Additionally, computer 70 may be able to defend its address on the bus. Computer 70 could also perform any of a variety of other node functions.

In certain embodiments, computer 70, under direction from a remote system, may be able to generate responses for bus 24 and/or controllers 22. For example, computer 70 may be able to generate messages to defend an address on bus 24. As another example, computer 70 may be able to generate messages to respond to Request_To_Send (RTS) and/or Clear_To_Send (CTS) messages. In general, computer 70 may generate any type of response message for bus 24 and/or controllers 22.

In particular embodiments, computer 70 acts as a server on a network. For example, computer 70 could have an Internet protocol (IP) address and send/receive bus messages as radio frequency local area network (RFLAN) messages. Thus, when protocol converter 30 was within range of a remote system, it could perform as a network access point.

The components of protocol converter 30 may have a variety of forms and arrangements. For example, bus connector 50 may be an assembly line diagnostic link (ALDL) having sixteen pins, a common configuration for cars, an ALDL having nine pins, a common configuration for trucks, or any other configuration that will allow it to send messages to and receive messages from bus 24. The nine pins for a truck could be assigned as follows: 1) two pins for power and ground; 2) three pins for J1939 communications; 3) two pins for J1708 communications; and 4) two pins for proprietary communications. The bus connector 50 may be connected to a Duetch connector, which is typically connected to the bus of a vehicle, by being plugged directly into it or by an intervening cable. In some embodiments, by changing the cable, protocol converter 30 may be used on different types of vehicles, for example, trucks and cars.

Protocol transceivers 60 may be any type of devices that can receive messages through bus connector 50 and format them for computer 70 and also receive messages from computer 70 and format them for bus 24. In particular embodiments, protocol transceiver 60a is an 82C251 manufactured by Siemens, protocol transceiver 60b is a DS36C279 manufactured by National Semiconductor, and protocol transceiver 60z is an HC912D60 manufactured by Motorola. In some embodiments, protocol transceivers 60 might be plug and play hardware transceivers, allowing protocol converters 60 to be used with an even wider variety of busses and/or protocols. Note that protocol converter 30 may have any number of protocol transceivers.

The components of computer 70 may also have a variety of forms and arrangements. Processor 70 may be a microprocessor, a microcontroller, an ASIC, an FPGA, a biological computer, an atomic computer, and/or any other type of device for manipulating information in a logical manner. Communication interfaces may be network interface cards, medium access units, transceivers, ports, modems, or any other type of device that conveys data to and from a computer. Memory 76 may be random access memory (RAM), read-only memory (ROM), compact-disk read-only memory (CD-ROM), electronically erasable programmable read-only memory (EEPROM), and/or any other type of volatile or non-volatile electromagnetic or optical data storage device. In certain embodiments, all or a part of memory 76 may be encoded on processor 74. In particular embodiments, computer 70 is an HC12D60 manufactured by Motorola.

Wireless communication device 80 may be any type of device that can receive messages from computer 70 and wirelessly transmit electromagnetic signals, including infrared, based on the messages. In particular embodiments, wireless communication device 80 should probably have sufficient communication bandwidth and internal memory storage to handle maximum data transmission rates on all vehicle busses for a sustained period of time for realistic vehicle bus loading scenarios. In certain embodiments, wireless communication device 80 is an ROK 101 007/1 manufactured by Ericsson. In some embodiments, protocol converter 30 many include multiple wireless communication devices. These may operate according to similar or different wireless protocols.

The components of protocol converter 30 may exchange information with each other by using any of a variety of formats and/or links. For example, the components may exchange information using serial communication interfaces (SCIs), serial peripheral interfaces (SPIs), universal asynchronous receiver-transmitters (UARTs), direct address mode links, and/or any other appropriate type of protocol/ links. Note that the throughput of protocol transceivers 60 should be considered in choosing appropriate links between the components. For example, J1939 messages are currently specified to be communicated at 250 Kbps. Thus, using a UART link, which can handle 500 Kbps, or more, is probably acceptable. However, for faster bus protocols, or when a variety of bus protocols must be handled simultaneously by protocol converter 30, a faster link may be necessary.

In particular embodiments, protocol converter 30 may include a variety of other interfaces for a user. For example, it may have a development interface, which may allow debugging of the converter, and/or a field service interface, such as a DB9/RS232 for exchanging information with and/or flash updating software for wireless device 80. As another example, protocol converter 30 may include a variety of light emitting diodes (LEDs) that inform the user of connection status, diagnostic information, configuration status, bus activity, and/or any other appropriate information.

Figure 3:
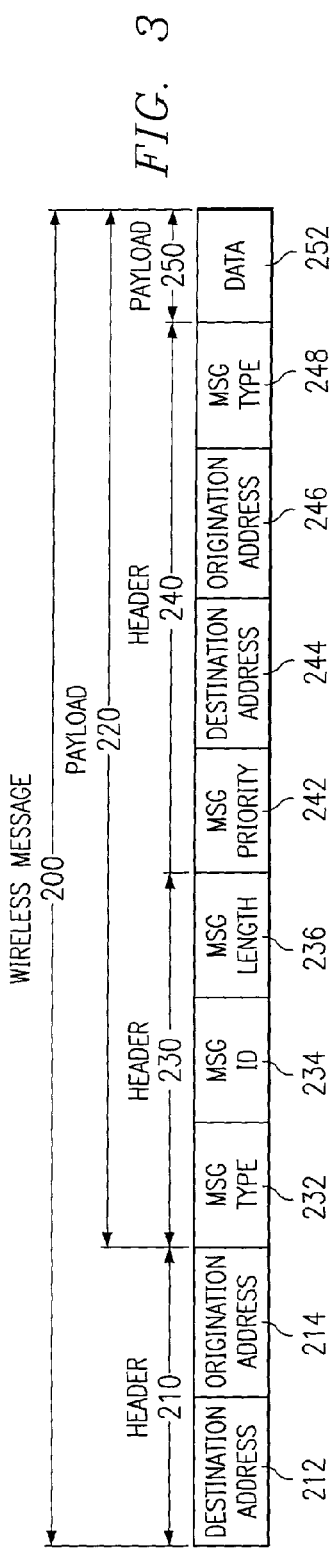
FIG. 3 illustrates one embodiment of a wireless message for carrying data between a protocol converter and a remote system.

FIG. 3 illustrates one embodiment of a wireless message 200 for carrying data between a protocol converter, such as, for example, protocol converter 30, and a remote system, such as, for example, diagnostic system 40. In the illustrated embodiment, wireless message 200 is carrying a vehicle bus message. Wireless message 200 includes a header section 210 and a payload section 220, which contains the bus message.

Header section 210 includes a first address field 212 and a second address field 214. First address field 212 contains the address of the wireless device for which the wireless message is destined, which would vary depending on whether the protocol converter or the remote system was transmitting the message. In turn, second address field 214 contains the address of the wireless device that transmitted the message.

Payload section 220 includes a header section 230, a header section 240, and a payload section 250, header section 240 and payload section 250 forming the bus message. Header section 230 includes a message type field 232, a message identifier field 234, and a message length field 236. Message type field 232 contains an identifier that specifies the bus protocol of the message or whether the message is destined for or from the protocol converter. As illustrated, the message contains a bus protocol message. Message identifier field 234 specifies the remote system application with which the message is associated. Accordingly, if the message was destined for a remote system, it would know with which application the bus message is associated. Message length field 236 indicates the length of the message following header section 230. Header section 240 includes a message priority field 242, a first address field 244, a second address field 246, and a message type field 248. Message priority field 242 contains the priority of the bus message. First address field 244 contains the destination address of the bus message. Second address field 244 contains the origination address of the bus message. Message type field 248 indicates the type of data in the bus message. Payload section 250 includes a data field 252 containing the data of the bus message.

As illustrated, wireless message 200 could be destined for a remote system, or one or more controllers on a vehicle bus. For example, if wireless message 200 is destined for a remote system, the protocol converter has received the bus message from a vehicle bus, determined that it is destined for and/or appropriate for the remote system, and formatted it into a message suitable for communication over a wireless link, forming wireless message 200. Upon receiving wireless message 200, the remote system may determine whether wireless message 200 is destined for it by examining the destination address in first address field 212 of header 210, and what wireless device transmitted wireless message 200 by examining the origination address in second address field 214 of header 210. Assuming the wireless message 200 is for the remote system and is from a proper wireless device, the remote system may then determine whether the message 200 contains a message from the protocol converter or a bus by examining message type field 232 and, if from a bus, what task the message associated with by examining message identifier field 234. The remote system may then examine the information in header section 240 and/or payload section 250 to determine information about the vehicle.

On the other hand, if wireless message 200 is destined for a controller on a vehicle bus, the remote system has formed the bus message in header section 240 and payload section 250, added header 230 for the protocol converter, and then formatted it into a message suitable for communication over a wireless link, forming wireless message 200. Upon receiving wireless message 200, the protocol converter may determine whether the wireless message is destined for it by examining the address in first address field 212 and what wireless device sent the wireless message by examining the address in second address field 214. Assuming the wireless message is destined for the protocol converter and from a proper wireless device, the protocol converter may determine whether the message is destined for it or a bus by examining message type field 232. If for a bus, the message type field will also indicate the appropriate bus protocol. The protocol converter may then remove header section 210 and header section 230 and insert the bus message, composed of header section 240 and payload section 250, onto the vehicle bus using the designated bus protocol.

It should be understood that wireless message 200 only illustrates one embodiment of a wireless message in accordance with the present invention. For different vehicle bus protocols, such as, for example, J1939, J1708, and J1850, the bus message, and consequently header section 240 and payload section 250, will probably be configured differently. Also, if wireless message 200 contains a message for the protocol converter, header section 240 and payload section 250 will probably be configured quite differently, possibly to the exclusion of header section 240. Additionally, for different wireless communication protocols, such as, for example, Bluetooth™ r RFLAN, header section 210 will probably be configured differently. For example, header section 210 may contain a synchronization word field, an acknowledgement field, an error correction field, a channel identification field, or any other appropriate type of wireless protocol field. Moreover, the whole of wireless message 200 may be configured differently for different vehicle bus protocols and/or wireless communication protocols.

Figure 4:
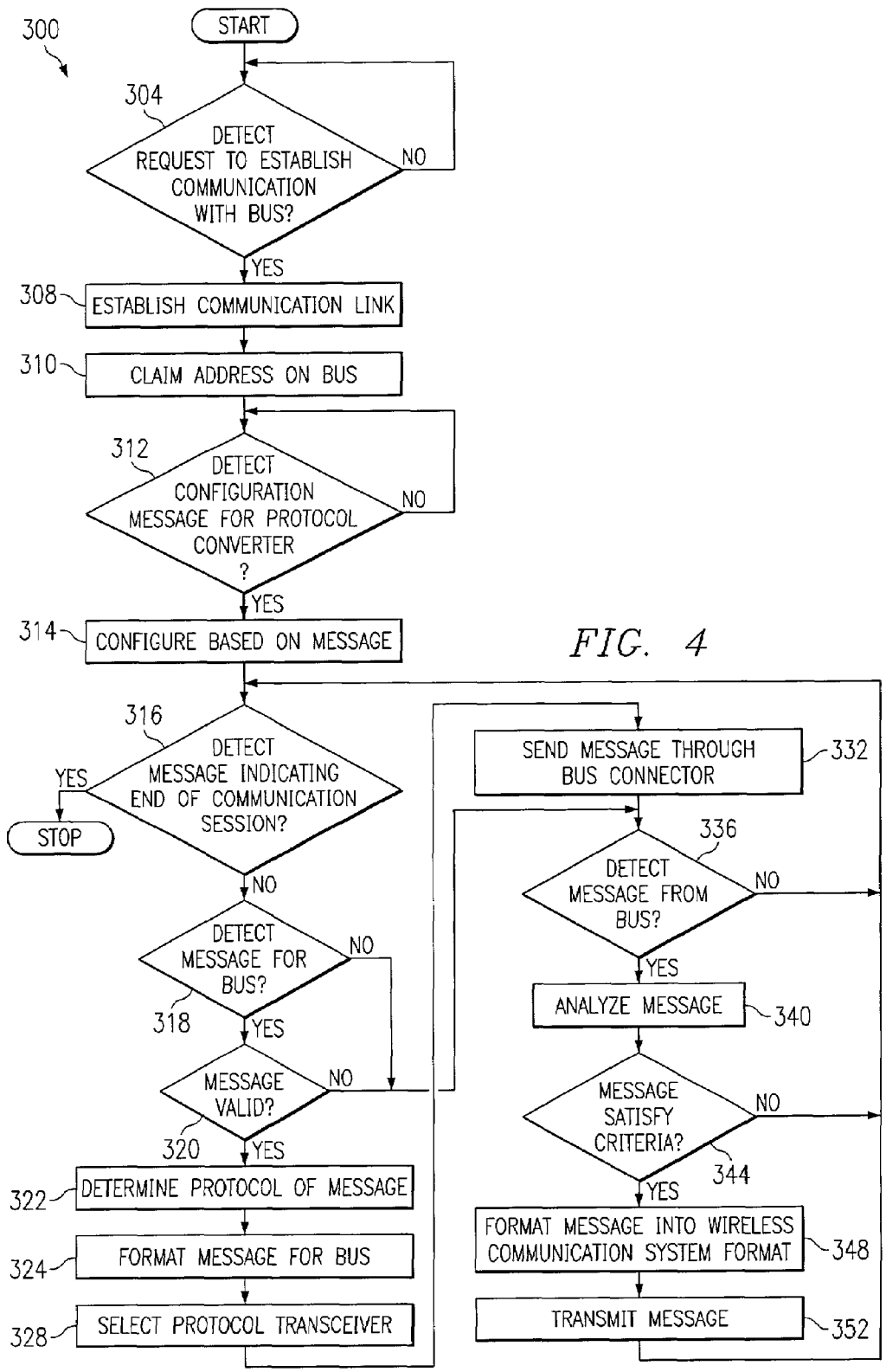
FIG. 4 is a flowchart illustrating one embodiment of a method of operation of a protocol converter in accordance with the present invention.

FIG. 4 is a flowchart 300 illustrating one embodiment of a method of operation for a protocol converter, such as, for example, protocol converter 30, in accordance with the present invention. At decision block 304, the protocol converter determines whether it detects a request to establish communication with the vehicle bus, such as, for example, bus 24. Such a request may originate from an appropriate remote system, such as, for example, diagnostic system 40. Upon detecting a request to establish communication with the vehicle bus, the protocol converter establishes a communication link with the requesting remote system at function block 308. Establishing a communication link may include responding with the protocol converter's wireless address, determining which channel(s) to use to exchange messages, synchronizing clocks, establishing timing and message types, determining whether the remote system is authorized to have access to the messages on the bus, checking internal memory and queues, and/or any of a variety of other link initiation issues. At function block 310, the protocol converter claims an address on the bus. Claiming an address on the bus may be performed automatically or in response to a request from the remote system. The protocol converter may also be responsible for defending the address. At decision block 312, the protocol converter waits to receive a message regarding the configuration of the protocol converter in regards to transmitting messages from the bus. Such a message may indicate what type of data and/or messages the remote system desires to receive from the bus and/or what portions of the bus to turn on or off. After receiving such a message, the protocol converter configures itself to send the appropriate data and/or messages at function block 314. At decision block 316, the protocol converter determines whether it detects a message indicating the end of the communication session. If the protocol converter detects a message indicating the end of the communication session, the communication session is stopped. If, however, the protocol converter does not detect a message indicating the end of the communication session, the protocol converter continues to decision block 318.

At decision block 318, the protocol converter determines whether it detects a message destined for the vehicle bus. The protocol converter may determine whether the message is destined for the bus by examining an identifier in the message, the destination address of the message, the protocol of the message, or any other appropriate indicator. If the protocol converter does detect a message destined for the bus, the protocol converter determines whether the message is valid at decision block 320. This validity determination may be based on the priority of the message, the message type, and/or any other appropriate factor that may assist in preventing improper messages from being placed on the vehicle bus. If the message is valid, the protocol converter determines the vehicle bus protocol to be used to insert the message onto the bus at function block 322. At function block 324, the protocol converter formats the message for communication on the bus. This may include removing headers for the wireless communication format and for the protocol converter, changing the protocol of the message, or any of a variety of other formatting operations required when communicating between different communication formats/protocols. The protocol converter selects an appropriate protocol transceiver, such as, for example, protocol transceiver 60*a*, to send the message to at function block 328 and sends the message through the bus connector at function block 332.

When the protocol converter does not detect a message for the bus at decision block 318, or when the protocol converter determines that a message is not valid at decision block 320, or when the protocol converter has sent a message through the bus connector at function block 332, the protocol converter determines whether it detects a message from the bus at decision block 336. If the protocol converter does not detect a message from the bus, the protocol converter returns to decision block 316. If, however, the protocol converter does detect a message from the bus, the protocol converter analyzes the message to determine whether it satisfies predetermined criteria at function block 340. As discussed previously, the predetermined criteria may include the address of the originating controller, the destination address for the message, the protocol used for the message, the priority of the message, the content of the message, and/or any other appropriate factor. In particular embodiments, the criteria may include whether the message is destined for a defended address and/or whether packetization has been enabled. The criteria may be established by commands from the remote system and stored locally by the protocol converter. If the protocol converter determines that the message does not satisfy the predetermined criteria at decision block 344, the protocol converter returns to decision block 316. If, however, the message does satisfy the predetermined criteria, the protocol converter formats the message into a wireless communication system format at function block 348 and transmits the message at function block 352. The protocol converter then returns to decision block 316.

Although flowchart 300 illustrates a variety of operations for a protocol converter in accordance with the present invention, other methods of operation may have fewer, greater, and/or a different arrangement of operations. For example, in some embodiments, a protocol converter may establish a communication link before detecting a request to establish communication with a bus. As an additional example, in particular embodiments, a protocol converter may not analyze a message to determine whether it satisfies predetermined criteria before transmitting the message over the wireless link. As another example, in certain embodiments, a protocol converter may store information regarding the associated vehicle and be able to transmit this information once a communication link is established. As a further example, in some embodiments, a protocol converter may implement multiple filters for the data on the bus. While the protocol converter may or may not have an identifier associated with each of the filters, in some embodiments, each filter may be associated with an address that the protocol converter has claimed on the bus. As another example, in some embodiments, a protocol converter may manage the transmission of the messages from the bus over the wireless link. As an additional example, in certain embodiments, a protocol converter may not claim an address on the bus or determine if a message is valid. As a further example, in particular embodiments, a protocol converter may not wait to receive a configuration message before beginning to send received wireless messages to the bus and/or transmit received bus messages over the wireless link, especially if the protocol converter has a default configuration, which may have been established by a remote system. As another example, in some embodiments, the protocol converter may receive and implement commands to turn portions of a bus on or off, establish additional and/or adjust filters, claim addresses, and/or perform any other appropriate function while receiving and/or transmitting vehicle bus data. A variety of other options exist.

FIG. 5A is a flowchart 500 illustrating a method for managing messages to be transmitted over a wireless link by a protocol converter in accordance with certain embodiments of the present invention. The method begins at start block 504, where the protocol converter has an established wireless link to a remote system and may or may not have been configured by the remote system to transmit messages. At decision block 506, the protocol converter determines whether it has received a bus message. If the protocol converter has received a bus message, it initiates a bus timer at function block 508. The bus timer relates to the time interval between activity on the vehicle bus. At decision block 510, the protocol converter determines whether the message is appropriate for transmission. The protocol converter may, for example, make this determination based on the previously discussed filtering criteria. If the message is appropriate for transmission, the protocol converter places the message in a buffer, such as, for example, buffer 78, at function block 512. At decision block 520, the protocol converter determines whether the received message is the only message in the buffer. If the message is the only one in the buffer, the protocol converter initiates a buffer timer at function block 524. The buffer timer relates to the interval since beginning to place messages in the buffer. The protocol converter then returns to check for additional messages at decision block 508.

If no messages are present at decision block 508, or if a received message is not appropriate for transmission at decision block 510, the protocol converter determines whether there are any message in the buffer at decision block 528. If there are no messages in the buffer, the protocol converter again checks whether any messages have been received at decision block 508. If, however, there are messages in the buffer, the protocol converter determines whether the buffer is sufficiently full at decision block 532. Note that the protocol converter may also reach decision block 532 if there are messages in the buffer at decision block 520. The buffer may be sufficiently full, for example, if the messages in it will occupy a significant portion of a slot on the wireless link. For instance, J1939 messages usually contain ninety-six bits, and slots on a Bluetooth™ link can usually contain six-hundred and twenty-five bits; accordingly, several J1939 messages may be sent in one slot. In some embodiments, however, three consecutive slots are used, allowing for more messages to be grouped together. With other wireless protocols and bus protocols, of course, the number of bus messages that may be sent in a slot, if the wireless protocols even have slots, could be quite different. If the buffer is sufficiently full, the protocol converter transmits the messages at function block 536. Note that transmitting the messages may involve placing them into an appropriate format for the transmission device. The protocol converter then returns to check for other received messages at decision block 508.

Returning to decision block 532, if the buffer is not sufficiently full, the protocol converter determines whether a buffer timeout has occurred. As mentioned previously, the buffer timer relates to the amount of time since the first message was placed in the buffer. Accordingly, there may be a period of time for which a message may be held before transmission without affecting operation of the remote system. In particular embodiments, the buffer timeout may be based upon how long it will take to fill up the buffer, whose size may be chosen to support one or more slots on the wireless link, given the maximum supported bus load with an average calculated over the period of filling the buffer. For example, in certain embodiments, at 50% bus utilization, messages arrive at an average of one per millisecond over a sufficiently long sample period. Thus, if there is a twelve element buffer, the buffer timeout should probably be approximately twelve milliseconds, and maybe a little higher to allow for slightly lower bus utilization to fill the buffer, possibly in the neighborhood of fifteen milliseconds. If a buffer timeout has occurred, the protocol converter transmits the messages in the buffer at function block 536.

If, however, a buffer timeout has not occurred, the protocol converter determines whether a bus timeout has occurred at decision block 544. As mentioned previously, the bus timer relates to the amount of time since there has been any vehicle bus activity. Accordingly, if there has been no bus activity for a period of time, the stored messages may need to be transmitted. The bus timeout may be based upon an average idle time from start of message to start of message at maximum utilization. In particular embodiments, this would equate to a timeout after approximately one millisecond, which may need to be adjusted slightly to allow for lower utilization, possibly in the neighborhood of one and one-fourth milliseconds. If a bus timeout has occurred, the protocol converter transmits the messages at function block 536. If a bus timeout has not occurred, the protocol converter returns to decision block 508 to determine whether any more messages have been received.

The method illustrated by flowchart 500 may be useful for conserving the resources of the wireless link. For example, if messages are small relative to slots, it may waste overhead to send each message by itself. As another example, there may be portions of each slot that are not used, wasting bandwidth.

While flowchart 500 illustrates one method for managing messages to be transmitted over a wireless link by a protocol converter, other embodiments may have fewer, more, and/or a different arrangement of operations by which a protocol converter can manage messages to be transmitted over a wireless link. For example, some methods may not use a bus timeout. As another example, some methods may not determine whether a message is appropriate for transmission. As an additional example, some methods may call for different transmissions depending upon the priority of messages. As a further example, some methods may call for checking whether messages have been received based on events. As still a further example, some methods may not user timers for the timeouts, relying on time stamps, for example. A variety of other examples exist.

FIG. 5B is a flowchart 550 illustrating another method for managing messages to be transmitted over a wireless link by a protocol converter in accordance with certain embodiments of the present invention. The method begins at start block 554, where the protocol converter has an established wireless link to a remote system and may or may not have been configured by a remote system. At decision block 558, the protocol converter determines whether it has received a message regarding a message to be sent in packets. Typically, such messages are large relative to some parameter of the wireless link, such as, for example, a slot or a wireless message format, and, thus, may require special handling by the protocol converter, although in some cases multiple slots may be used. An example of such a message may be a Request_To_Send message in J1939. If the protocol converter has not received such a message, it waits to receive such a message before proceeding with further operations in the method. Once the protocol converter receives such a message, it determines whether sufficient resources are available at decision block 562. Determining whether sufficient resources are available may entail determining the current operations being handled by the protocol converter, determining the size of the message to be sent relative to the capacity of the wireless link, determining the memory available at the protocol converter, and/or any other appropriate factor. If sufficient resources are not available, the protocol converter generates a negative acknowledgement message at function block 566 and returns to wait for another message at decision block 558.

If, however, sufficient resources are available, the protocol converter may generate a positive acknowledgment message at function block 570. This message may then be sent over the vehicle bus. At decision block 574, the protocol converter determines whether packetization is available. The protocol converter may make this determination by determining whether the remote system can handle a packetized message, by receiving a packetization enable command from the remote system, and/or by any other appropriate technique. If packetization is not available, the protocol converter manages the incoming message at function block 578. Managing the incoming message may entail transmitting portions of the message as they are received from the vehicle bus without packetizing them. Once the message has been transmitted, the protocol converter returns to decision block 558 to check for other messages.

Returning to decision block 574, if packetization is available, the protocol converter generates an initialization message regarding the message to be sent at function block 582. This message may then be transmitted to the remote system. This message may contain information indicating that a message is to be sent, the size of the message, and how the message will be sent. At function block 586, the protocol converter manages the incoming message. Managing the message may entail packetizing portions of the messages, formatting the packets for transmission over the wireless link and/or for the remote system, ensuring that the message segments are sent in sequence, performing error correction, and/or any other appropriate function. Note that it will be up to the remote system to assemble the packets into one message. Once the message is complete, the protocol converter generates a message for the remote system indicating that the message has been sent at function block 590. The protocol converter may then transmit this message.

While flowchart 550 illustrates one method for managing messages to be transmitted over a wireless link by a protocol converter, other embodiments may have fewer, more, and/or a different arrangement of operations by which a protocol converter may manage messages to be transmitted over a wireless link. For example, in some embodiments, the transmission over the wireless link and/or the packetization of the messages may result in an unacceptable delay between when the message was sent over the bus and the receipt of the message by the remote system. Accordingly, the protocol converter may generate a response to the message, such as, for example, an message received acknowledgment, and place the response on the bus. Thus, the originating controller will not sense that an error has occurred. As another example, in certain embodiments, a protocol converter may not send an acknowledgement to the message indicating that a message is to be sent over the bus to the protocol converter. This may happen, for example, if the message is a Broadcast Announce Message (BAM).

Figure 6:
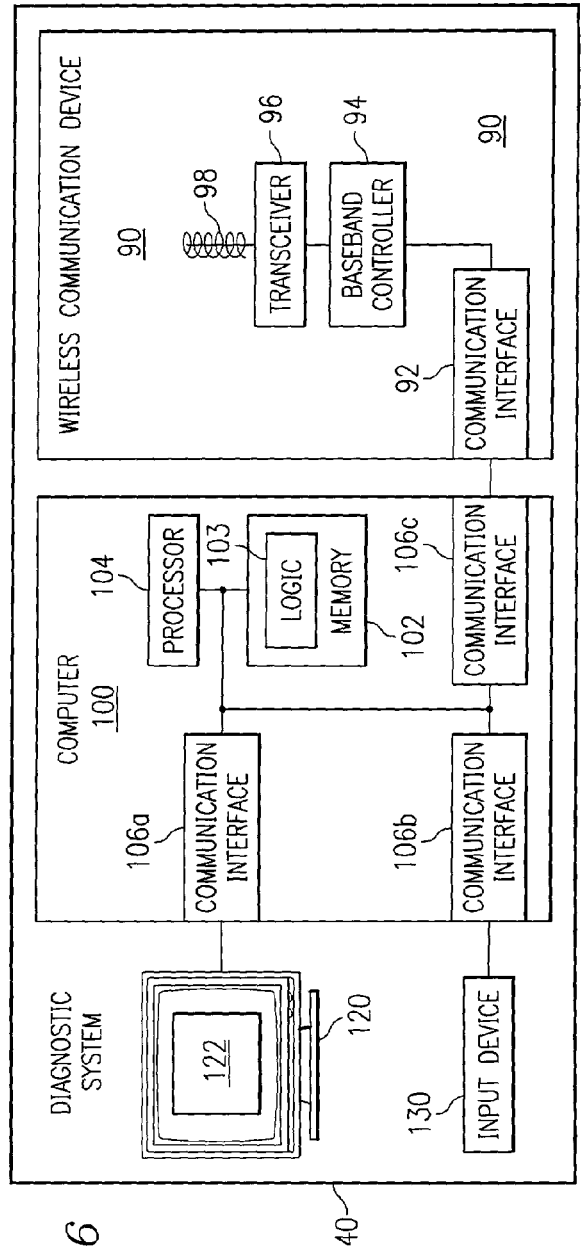
FIG. 6 illustrates one embodiment of a diagnostic system in accordance with the present invention.

FIG. 6 illustrates one embodiment of diagnostic system 40 for system 10. In this embodiment, diagnostic system 40 includes a wireless communication device 90, a computer 100, a display 120, and an input device 130. In general, wireless communication device 90 is operable to transmit data to and receive data from protocol converter 30 using wireless link 32. Additionally, wireless communication device 90 is operable to receive messages to be transmitted to protocol converter 30 from computer 100 and provide messages received over the wireless link from protocol converter 30 to computer 100. Computer 100 is operable to generate messages to be sent over the wireless link to protocol converter 30 and process messages that are received over the wireless link from protocol converter 30. Display 120 is operable to show a user interface 122 generated by computer 100 so that data may be displayed to a user of diagnostic system 40. Input device 130 is operable to allow a user of diagnostic system 40 to enter commands and/or data for computer 100.

In more detail, computer 100 includes a memory 102, a processor 104, and communication interfaces 106 coupled together. Memory 102 is operable to store messages to be transmitted over the wireless link, messages received over the wireless link, and/or a set of logic 103 for processor 104. Processor 104, according to logic 103 in memory 102, is operable to generate messages for protocol converter 30 and analyze messages received from protocol converter 30. For example, processor 104 may generate a command for protocol converter 30 to implement a filter for the messages on bus 24 and/or to claim an address on bus 24. Processor 104 sends the generated message through communication interface 106c to wireless communication device 90 for transmission to protocol converter 30 and receives messages from protocol converter 30 through communication interface 106c from wireless communication device 90. Additionally, processor 104 is operable to generate a user interface 122 to be shown by display 120. Processor 104 communicates with display 120 through communication interface 106a. Furthermore, processor 104 is operable to receive commands from a user through input device 130. Processor 104 communicates with input device 130 through communication interface 106b.

Wireless communication device 90 includes a communication interface 92, a baseband controller 94, a transceiver 96, and an antenna 98. Wireless communication device 90 communicates with computer 100 through communication interface 92 and, thus, receives messages to be transmitted over wireless link 32 and sends messages received over wireless link 32 through communication interface 92. Note that wireless communication device 90 also exchanges control messages with computer 100. Baseband controller 94 is coupled to communication interface 92 and is operable to format messages from computer 100 for transmission over wireless link 32 and also to format messages received over wireless link 32 for computer 100. For example, baseband controller 92 may format a message to be transmitted into an appropriate protocol for wireless link 32 and format a message received over wireless link 32 into an appropriate protocol format for computer 100. Additionally, baseband controller 92 may determine a modulation sequence for the formatted message, perform error correction, determine which channel to use in a channel hopping sequence, perform a security check on a received message, and/or any other appropriate operation. In particular embodiments, baseband controller 94 implements certain layers of a wireless protocol stack, such as, for example, L2CAP or HCI. Transceiver 96 is coupled to baseband controller 94 and is operable to transmit the messages formatted by baseband controller 94 over wireless link 32 using antenna 98 and receive messages over wireless link 32 through antenna 98 and provide them to baseband controller 94. For example, transceiver 96 may transmit a message over wireless link 32 by modulating a carrier frequency based on the formatted message from baseband controller 94 and may provide a message received over wireless link 32 by removing a carrier frequency.

In operation, when processor 104 determines that a user and/or an application wants to initiate communication with vehicle bus 24, processor 104 determines the wireless devices that it may use to communicate with a protocol converter. While in the illustrated embodiment processor 104 only has once choice, wireless communication device 90, in other embodiments, processor 104 may have any number of choices. Processor 104 may accomplish this by examining data stored in memory 102 regarding local wireless devices, by initiating a query for local wireless devices, or by any other appropriate process. Once processor 104 determines what local wireless devices are available, processor 104 generates a user interface indicating the available local wireless devices. This user interface may be communicated to display 120 so that it may show the user interface to the user. Process 104 waits to detect the selection of a local wireless device. When processor 104 detects selection of a local wireless device, possibly by receiving a command from input device 130, processor 104 instructs the selected local wireless device to query protocol converters, such as, for example, protocol converter 30, that are in the vicinity. In the illustrated embodiment, baseband controller 94 of wireless communication device 90 could accomplish this task. Baseband controller 94 may generate the query and transceiver 96 may transmit it through antenna 98. Responses from the protocol converters will be received by transceiver 96 through antenna 98. After transceiver 96 performs the initial operations for converting the responses out of the wireless format, transceiver 96 communicates the responses to baseband controller 94, which will perform further processing for converting the messages out of the wireless format. The responses will then be conveyed from the wireless communication device 90 to computer 100 so that processor 104 may generate a user interface indicating the available protocol converters. The user interface may be shown on display 120. Processor 104 then waits to detect selection of a protocol converter. The selection may be made, for example, by detecting a command from user input device 130. Once processor 104 understands which protocol converter it is supposed to communicate with, it may instruct wireless communication device 90 to establish a communication link with the selected protocol converter.

Processor 104 may then wait to receive a command for configuring the protocol converter. For example, processor 104 may wait for a command to turn on a portion of bus 24, to claim an address on bus 24, to establish a filter for bus 24, and/or to perform any other appropriate configuration operation. Processor 104 may then generate a command for the protocol converter and send the command to wireless device 90 for transmission to the protocol converter. Processor 104 may then wait to receive a message relating to the vehicle bus. Processor 104 may also generate and/or receive requests for the protocol converter. For example, processor 104 may want protocol converter 30 to send information about itself to diagnostic system 40. Processor 104 may form a command instructing protocol converter 30 to accomplish such requests.

When processor 104 detects a message relating to the vehicle bus, the processor determines whether the message is a command that the protocol converter can implement or an actual message for the vehicle bus. The message may be from the user of diagnostic system 40 or generated by processor 104 according to logic 103, which may have generated the message in response to a command from the user. If the message is a command that the protocol converter can implement, such as, for example, to establish a bus message filter, processor 104 may generate a command for the protocol converter and send the command to wireless device 90 for transmission to the protocol converter. If, however, the message is not a command that the protocol converter can implement, processor 104 converts the message into an appropriate format for the vehicle bus and sends the message to wireless communication device 90 for transmission to the protocol converter, which forwards the message to the vehicle bus.

Diagnostic system 40 may also receive data from the vehicle bus. This data will be received through the wireless communication device 90 and sent to computer 100, which may generate a user interface containing the vehicle bus data. Display 120 may show the user interface. Also, processor 104 may generate a response to the message from the vehicle bus, such as, for example, an acknowledgment or a command, and/or analyze the message to determine information about vehicle 20. Diagnostic system 40 may continue to receive messages from the vehicle bus and generate messages to be conveyed to the vehicle bus.

The components of diagnostic system 40 may have a variety of forms and/or arrangements. For example, processor 104 may be a microprocessor, a microcontroller, an ASIC, an FPGA, a biological computer, an atomic computer, and/or any other type of device for manipulating data in a logical manner. As another example, memory 102 may be RAM, ROM, CD-ROM, EEPROM, and/or any other type of volatile or non-volatile electromagnetic or optical data storage device. In some embodiments, some or all of memory 103 may be encoded on processor 104. As a further example, communication interfaces 106 may be transceivers, network interface cards, modems, ports, and/or any other type of device through which data may be conveyed. In particular embodiments, computer 100 is a Thinkpad 600E manufactured by IBM. As an additional example, display 120 may be a cathode-ray tube display, a liquid crystal display, a gas-plasma display, or any other type of device for generating visual information for a user. As another example, user interface 122 may be a graphical user interface, a text-based user interface, and/or any other type of organization for conveying visual information to a user. As a further example, input device 130 may be a keyboard, a mouse, a microphone, and/or any other type of device for receiving input from a user and converting it into data intelligible to processor 104. As still a further example, wireless communication device 90 may be any type of device that can receive messages from computer 100 and transmit electromagnetic signals based on the messages. In a particular embodiment, wireless communication device 90 is a Bluetooth™ radio manufactured by DigiAnswer.

The components of diagnostic system 40 may exchange information with each other by using any of a variety of formats and/or links. For example, the components may exchange information using serial communication interfaces, serial peripheral interfaces, universal asynchronous receiver transmitters, direct access mode links, and/or any other appropriate type of protocol or links.

In particular embodiments, diagnostic system 40 may have a plurality of local wireless devices. Thus, when computer 100 detects a command to establish communication with a vehicle bus, computer 100 may have to determine which wireless communication device to use. The communication devices may be connected to computer 100 through an industry-standard architecture (ISA) bus, a peripheral component interconnect (PCI) bus, a UART, and/or any other type of parallel or serial link. In certain embodiments, however, computer 100 may only have one local wireless device and, thus, not have to perform this task.

In certain embodiments, diagnostic system 40 may operate autonomously, at least in certain modes. Accordingly, diagnostic system 40 may continuously, periodically, and/or in any other appropriate manner monitor the status of controllers 22 and/or vehicle 20. The messages and/or status may be stored locally by diagnostic system 40 for later retrieval and/or communicated to an external device.

Figure 7:
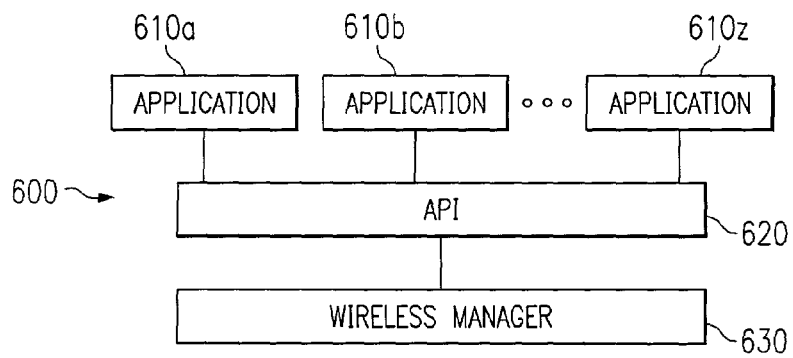
FIG. 7 illustrates an architecture for logic in the diagnostic system of FIG. 6 in accordance with one embodiment of the present invention.

FIG. 7 illustrates an architecture 600 for logic 103 in memory 102 in accordance with one embodiment of the present invention. As illustrated, architecture 600 includes a plurality of applications 610, an application program interface (API) 620, and a wireless manager 630. In general, applications 610 are operable to interact with one or more controllers on a vehicle bus, such as, for example, controllers 22, and/or monitor messages on the vehicle bus. API 620 is operable to translate messages from applications 610 into appropriate messages for the vehicle bus and to translate messages from the vehicle bus into an appropriate format for applications 610. Wireless manager 630 is operable to receive the translated messages from API 620 and have them wirelessly communicated to the vehicle bus. Wireless manager 630 is also operable to receive wireless messages pertaining to the vehicle bus and forward them to API 620.

In particular embodiments, API 620 is operable to interpret messages from applications 610 to determine whether they specify functions that the protocol converter can implement. For example, a message from one of applications 610 may direct that an address be claimed on the vehicle bus. As discussed previously, this is a function that protocol converter 30 can accomplish. Accordingly, API 620 would form a command for the protocol converter and have this command communicated to the protocol converter, which would perform the operation. Another example of such a message would be one specifying a filter to be implemented for the data on the vehicle bus. A variety of other examples exist.

Additionally, in particular embodiments, more than one of applications 610 may be sending messages to and/or receiving messages from the vehicle bus through API 620. Accordingly, API has the responsibility for coordinating the messages from each of the applications and the messages for each of the applications. To accomplish this, API 620 may assign an identifier to each of the currently running applications 610 and communicate the identifier along with a filter for the application to the protocol converter. Thus, when API 620 receives an identifier along with vehicle bus data, it will know where to direct the vehicle bus data. In particular embodiments, the identifier may be an address on the vehicle bus. Additionally, the filter may use any type of criteria, even passing all messages.

The elements of architecture 600 may have a variety of forms and/or arrangements. For example, applications 610 may be diagnostic programs for a specific controller on the vehicle bus 24, such as, for example, a brake controller, a transmission controller, or an engine controller. Examples of this type of application are TransPro produced by Allison Transmission and Master Diagnostics produced by Navistar/International. As a further example, one or more of applications 610 may diagnose problems with a vehicle. As another example, API 620 may be any type of application that translates between one or more of applications 610 and the protocol used on the vehicle bus. In particular embodiments, API 620 complies with RP1210a promulgated by The Maintenance Council (TMC). Accordingly, architecture 600 may allow existing vehicle bus applications that use RP1210A to be implemented wirelessly with little or no modification to the applications. As a further example, wireless manager 630 may manage the communications from API 620, may act as a stand-alone diagnostic tool, or a combination of both. The functions of API 620 and wireless manager 630 may be distributed between them in a variety of manners.

Figure 8:
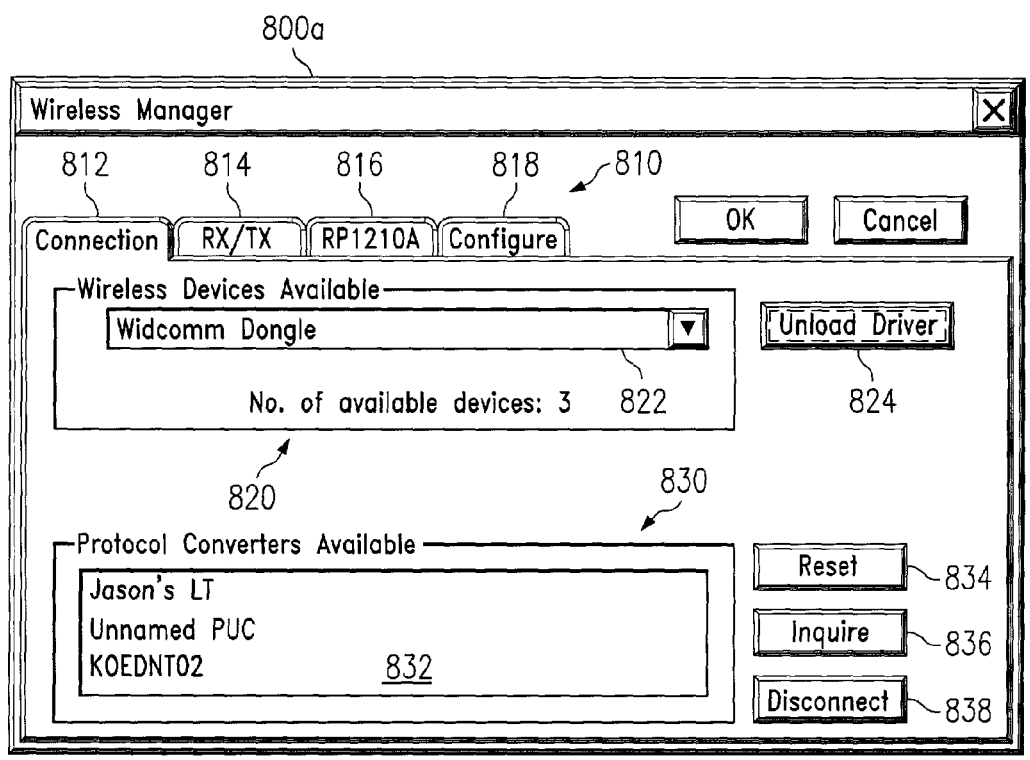
FIGS. 8–10 illustrate a user interface for a diagnostic system in accordance with one embodiment of the present invention.
Figure 9:
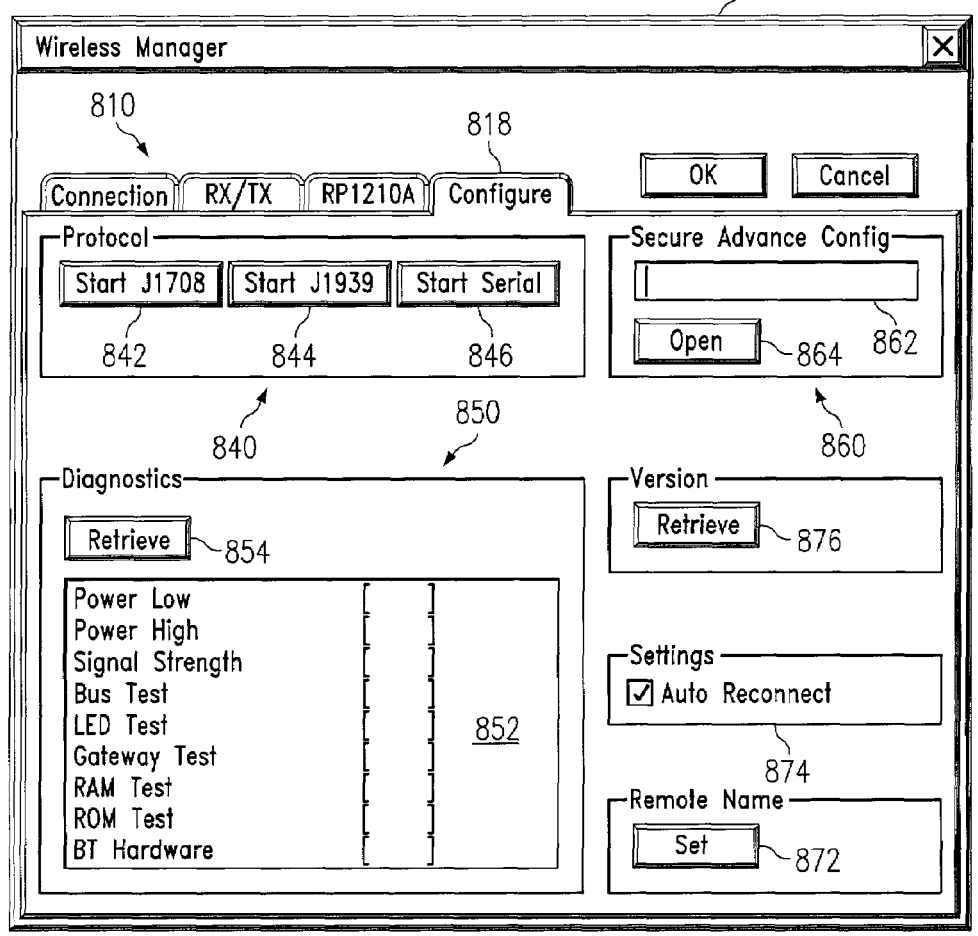
Figure 10:
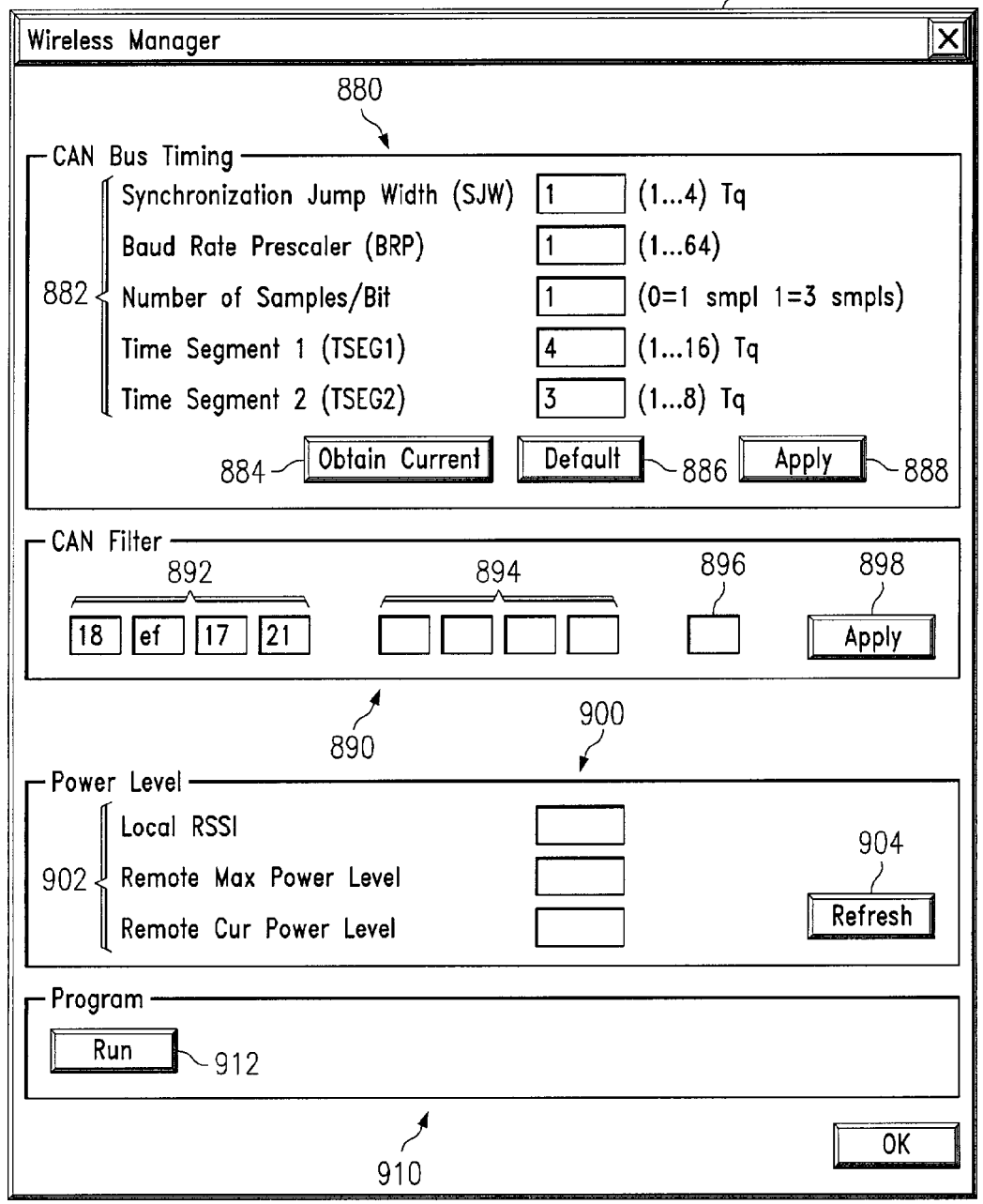

FIGS. 8–10 illustrate a user interface for a wireless manager in accordance with one embodiment of the present invention. As illustrated, the user interface includes a plurality of screens 800. The user interface could be useful when using the wireless manager as a stand-alone diagnostic system and/or when using the wireless manager to manage communications from one or more applications. The user interface will be discussed in detail with respect to the former.

Screen 800a is typically the first screen encountered upon initiation of the wireless manager. As illustrated, screen 800a includes function selection tabs 810, a wireless device section 820, and a protocol converter section 830. Function selection tabs 810 allow a user to select between a variety of functions for the wireless manager. Selection of tab 812 displays screen 800a, which allows the selection of a local wireless device and a protocol converter for a communication session. Selection of tab 814 displays messages being transmitted to and received from the vehicle bus. Selection of tab 816 displays the applications currently using the wireless manager. Selection of tab 818 displays a screen that allows configuration of the selected protocol converter, and will be discussed in more detail below. Wireless device section 820 indicates the wireless devices available locally for the wireless manager, such as, for example, wireless communication device 90. As illustrated, wireless device section 820 includes a pull-down menu 822 that lists the available wireless devices for the wireless manager. Wireless device section 820 also includes button 824, whose activation allows the selection and deselection of a wireless device. As illustrated, the wireless device entitled "Widcomm Dongle" is the current wireless device being used by the wireless manager. Protocol converter section 830 allows the selection of a protocol converter with which to communication, such as, for example, protocol converter 30. As illustrated, protocol converter section 830 includes a window 832 that lists the protocol converters with which the wireless manager may communicate. The available protocol converters are typically identified by the wireless manager having a query sent to determine the protocol converters in the vicinity. As illustrated, window 832 indicates that three protocol converters are available for communication with the remote system, and the protocol converter entitled "Unnamed PUC" is currently the selected protocol converter. Protocol converter section 830 also includes buttons 834, 836, and 838. Activation of button 834 resets protocol converter section 830. Activation of button 836 instructs the wireless manager to inquire as to the protocol converters in the vicinity. In certain embodiments, however, the selection of the wireless device in wireless device section 820 automatically performs the inquiry of the protocol converters in the vicinity. Activation of button 838 instructs the wireless manager to establish or break a wireless link with a selected protocol converter. Accordingly, while operating the wireless manager, the protocol converter being communicated with may be changed.

Screen 800b is generated upon selection of tab 818 of function selections tab 810. As illustrated, screen 800b also includes a protocol section 840, a protocol converter parameter section 850, and a protocol converter configuration section 860. Protocol section 840 contains buttons 842, 844, and 846 that allow a user to specify the protocol of the messages to be communicated from the vehicle bus. Accordingly, activation of button 842 will send messages using the J1708 protocol from the vehicle bus, activation of button 844 will send messages using the J1939 protocol from the vehicle bus, and activation of button 846 will send messages using a proprietary protocol from the vehicle bus. Accordingly, activation of buttons 842, 844, and 846 may specify one type of filter for the data on the vehicle bus. Upon detecting the activation of one of buttons 842, 844, and 846, wireless manager sends a message specifying the selected protocol to the selected protocol converter so that the protocol converter may implement an appropriate filter. Protocol converter parameter section 850 includes a window 852 in which the parameters of the selected protocol converter may be displayed. The wireless manager generates a message to retrieve these parameters upon detecting the activation of a button 854. Although several parameters for a protocol converter are shown in window 852, other embodiments may include less, more, and/or different parameters for a protocol converter. Protocol converter configuration section 860 includes a window 862 into which a passcode may be entered to access advanced configuration of the protocol converter. After entering the passcode, activation of button 864 instructs the wireless manager to determine whether the passcode is appropriate. The wireless manager may, for example, accomplish this by forming a message containing the passcode and sending the message to the protocol converter and receiving an acceptable acknowledgment from the protocol converter. Upon receiving an acceptable acknowledgement, the wireless manager will allow advanced configuration of the protocol converter, which will be discussed in more detail below with respect to screen 800c.

Screen 800b also includes a variety of other functions. For example, activation of button 872 allows the designation of a textual name for a protocol converter. Typically, the address of a protocol converter is a series of numbers, such as, for example, a media access control (MAC) address. Accordingly, specifying a textual name for a protocol converter may ease the identification of a particular protocol converter to a user. The textual name for the protocol converter may be stored locally with the wireless manager, remotely on the protocol converter, and/or both locally and remotely. Settings section 874 allows a user to specify whether to automatically reconnect with the protocol converter if the wireless link is lost. Activation of a button 876 allows retrieval of information about the software and/or logic on the selected protocol converter.

As mentioned above, the wireless manager generates screen 800*c* when an acceptable password is entered into protocol converter configuration section 860 of screen 800*b*. As illustrated, screen 800*c* includes a bus timing section 880, a bus filter section 890, a wireless link power section 900, and a programming section 910.

Bus timing section 880 allows the display of the current timing used on the vehicle bus and/or the specification of the timing to be used on the vehicle bus. As illustrated, bus timing section 880 includes fields 882, which display bus timing parameters, and buttons 884, 886, and 888. Activation of button 884 instructs the wireless manager to retrieve the current timing used on the vehicle bus. Upon detecting activation of button 884, the wireless manager generates a message for the protocol converter and has the message transmitted over the wireless link. When a response is received, the wireless manager may display the data in fields 882. Activation of button 886 displays the default timing used by the wireless manager. Activation of button 888 instructs the wireless manager to construct a message that specifies that the timing in fields 882 be used on the vehicle bus. In particular embodiments, the protocol converter may adjust the timing on the vehicle bus.

Bus filter section 890 allows the specification of filters for the messages on the vehicle bus. As illustrated, bus filter section 890 includes fields 892, 894, and 896 and a button 898. The first of fields 892 relates to the priority of messages on the vehicle bus. Accordingly, the value in the first of fields 892 specifies the priority of messages that should be sent from the vehicle bus. The second of fields 892 relates to the type of data in a message on the vehicle bus. Accordingly, the value in the second of fields 892 specifies the data content of messages that should be sent from the vehicle bus. The third of fields 892 relates to the address of the controller originating a message on the vehicle bus. Accordingly, the value in the third of fields 892 specifies the controller from which messages are desired. The fourth of fields 892 relates to the destination address of a message on the vehicle bus. Accordingly, the value in the fourth of fields 892 specifies the controller to which messages are desired. It should be noted that one or more of fields 892 may be specified. Fields 894 allow the specification of which bits are important for fields 892. Field 896 allows the specification of the application with which the filter is associated. Activation of button 898 instructs the wireless manager to generate and send a message to the selected protocol converter to implement the filter data specified in fields 892 and 894. In particular embodiments, several filters, such as, for example, up to thirty-two, may be implemented by a protocol converter. As mentioned previously, these filters may be associated with an address that the protocol converter has claimed on the bus, an identifier that has been specified by the wireless manager, or identified in any other appropriate manner. In other embodiments, fewer, more, and or different filtering criteria could be implemented.

Wireless link power section 900 allows display of parameters relating to the power of the wireless link. Section 900 includes fields 902 that contain power related parameters and a button 904. As illustrated, fields 902 display the power level of transmissions from the protocol converter, the maximum power level that may be achieved by the protocol converter, and the current power level being used by the protocol converter. Activation of button 904 allows refreshing of the data in window 902. Accordingly, wireless link power section 900 may be useful for determining whether a protocol converter is positioned advantageously to the selected wireless device.

Programming section 910 includes a button 912, the activation of which will reprogram/update the software on the protocol converter. Note that a wired physical connection may also be use for this function.

The user interface illustrated by screens 800 is particularly useful when the wireless manager is acting as a stand-alone diagnostic tool. Accordingly, through the wireless manager, a user may select a protocol converter, specify filters for the protocol converter, and observe messages being sent over the vehicle bus. Additionally, a user may determine whether a protocol converter is positioned advantageously relative to the wireless device being used by the wireless manager and retrieve parameters regarding the protocol converter. Note that not all embodiments of the wireless manager have to have all of these functions.

Additionally, in some embodiments, screens 800 may be used with an application that desires to observe messages and/or place messages on the vehicle bus, such as, for example, one of the applications 610. For example, upon the initiation of one of applications 610, wireless manager 630 may generate screen 800*a*, so that a user of the application may select the protocol converters with which to connect. For instance, if system 10 is being used in a service facility containing a variety of vehicles, the user of a brake diagnostic application may want to connect to the protocol converter of a specific vehicle. Additionally, wireless manager 630 may generate screens showing the data being sent between the application and bus 24 and allow the user to specify filters to be used for the data for the bus 24, as well as a variety of other functions previously described.

It should be recognized that screens 800 only illustrate on embodiment of a user interface for a wireless manager. Accordingly, other embodiments may include more, less, and/or a different arrangement of data and functions.

Figure 11:
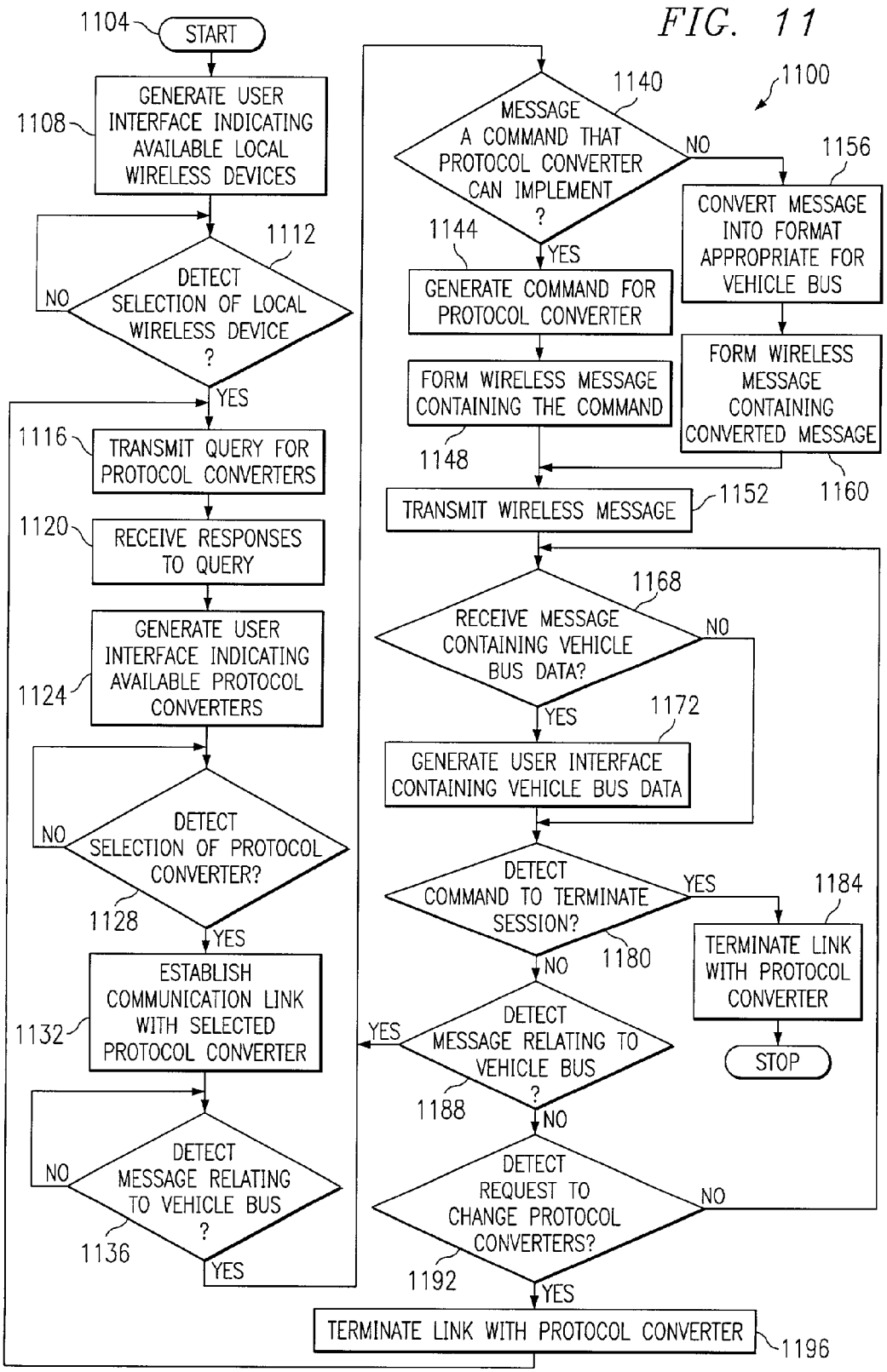
FIG. 11 is a flowchart illustrating a method of operation of a diagnostic system in accordance with one embodiment of the present invention.

FIG. 11 is a flowchart 1100 illustrating the operation of a diagnostic system in accordance with one embodiment of the present invention. The method begins at start block 1104, which may correspond with the initiation of the wireless manager or an application desiring to interact with the vehicle bus, such as, for example, a diagnostic application for a controller on the bus. At function block 1108, the diagnostic system generates a user interface indicating the local wireless devices available for establishing a wireless link with a protocol converter, such as, for example, protocol converter 30. The user interface may be shown on a display, such as, for example, display 120. The diagnostic system waits to detect selection of a local wireless device at decision block 1112. Detecting such a selection may, for example, be accomplished by detecting the activation of button 824 in wireless device section 820 of screen 800*a*. At function block 1116, the diagnostic system generates and transmits a query to discover protocol converters in the vicinity. The query is transmitted by the selected local wireless device. At function block 1120, the diagnostic system receives responses to the query. Using these responses, the diagnostic system generates a user interface indicating available protocol converters at function block 1124. This user interface may also be shown on a display. At decision block 1128, the diagnostic system waits to detect selection of one of the indicated protocol converters. The diagnostic system may determine that a protocol converter has been selected, for example, by detecting the activation of button 838 in protocol converter section 830 of screen 800*a*. Upon detecting the selection of a protocol converter, the diagnostic system establishes a communication link with the selected protocol converter at function block 1132. In embodiments where the diagnostic system uses the Bluetooth™ protocol, the diagnostic system may accomplish this by establishing an asynchronous link with the selected protocol converter.

At decision block 1136, the diagnostic system waits to detect a message relating to a vehicle bus. The message may be a message for a controller on the vehicle bus, a command for the protocol converter, or any other appropriate type of message and may be received from a user or generated internally. Upon detecting a message relating to a vehicle bus, the diagnostic system determines whether the message is a command that the selected protocol converter can implement at decision block 1140. One example of such a message is a filter for messages on the vehicle bus. If the message is a command that the protocol converter can implement, the diagnostic system generates a command for the protocol converter at function block 1144. The diagnostic system then forms a wireless message containing the command at function block 1148 and transmits the wireless message at function block 1152. If, however, the message is not a command that the protocol converter can implement, such as, for example, a message to a controller on bus 24, the diagnostic system converts the message into a format appropriate for the vehicle bus at function block 1156 and forms a wireless message containing the converted message such as, for example, message 200, at function block 1160. The diagnostic system then transmits the wireless message at function block 1152.

The diagnostic system determines whether it has received vehicle bus data at function block 1168 and, if it has, generates a user interface containing the vehicle bus data at function block 1172. After generating the user interface, or if no message containing vehicle bus data has been received, the diagnostic system determines whether it detects a command to terminate the communication session with the protocol converter at decision block 1180. If the diagnostic system detects a command to terminate the session, the diagnostic system terminates the link with the protocol converter at function block 1184. If, however, the diagnostic system does not detect a command to terminate the session, the diagnostic system determines whether it detects a message relating to the vehicle bus at decision block 1188. If the diagnostic system detects a message relating to the vehicle bus, the diagnostic system returns to decision block 1140. If, however, the diagnostic system does not detect a message relating to the vehicle bus, the diagnostic system determines whether it detects a request to change protocol converters at function block 1192. If the diagnostic system does not detect a request to change protocol converters, the diagnostic system returns to decision block 1168. If, however, the diagnostic system detects a request to change protocol converters, the diagnostic system terminates the link with the protocol converter at function block 1196 and begins the protocol converter initiation process again at function block 1116.

Although flowchart 1100 illustrates a variety of operations for a diagnostic system in accordance with one embodiment of the present invention, other embodiments of diagnostic systems in accordance with the present invention may use fewer, greater, and/or a different arrangement of operations. For example, in particular embodiments, a diagnostic system may not generate a user interface indicating the available local wireless devices and wait to detect a selection of one of the local wireless devices if only one local wireless device is available. As another example, in some embodiments, the diagnostic system may not generate a user interface containing the vehicle bus data. As a further example, in certain embodiments, a diagnostic system may establish a communication link with the protocol converters upon receiving a response to the query. As an additional example, in some embodiments, the diagnostic system may begin to receive and/or send vehicle bus data before detecting a message relating to the vehicle bus, especially if the protocol converter has been preconfigured, which might have been done by the remote system in a previous communication session. As still a further example, in particular embodiments, the diagnostic system may configure the protocol converter before sending and/or receiving data from the vehicle bus. A variety of other examples exist.

Although the present invention has been discussed primarily with respect to a vehicle diagnostic system, the invention may have applicability to other systems that need to access the vehicle bus. For example, one or more controllers, or possibly another component coupled to a vehicle bus, may store and/or sense information regarding the vehicle that a remote system desires to retrieve. The present invention may be able to assist in retrieving that information. As another example, a remote system having a development application, such as a spark algorithm for an engine controller, may desire to receive information from the vehicle bus. In general, therefore, the present invention is useful for sending data that a vehicle bus conveys, actual data about the bus, or any other type of data relating to a vehicle bus to a remote system. Note that the remote system may be internal or external to the vehicle.

While a variety of embodiments have been discussed for the present invention, a variety of additions, deletions, modifications, and/or substitutions will be readily suggested to those skilled in the art. It is intended, therefore, that the following claims encompass such additions, deletions, modifications, and/or substitutions.

What is claimed is:

1. A system for vehicle protocol conversion, comprising:
a bus connector adapted to be coupled to a vehicle bus;
a protocol transceiver coupled to the bus connector, the protocol transceiver operable to:
receive messages destined for communication through the bus connector and send the messages through the bus connector according to a vehicle bus protocol, and
receive messages through the bus connector according to the vehicle bus protocol;
a computer coupled to the protocol transceiver, the computer operable to:
claim multiple addresses on the bus,
analyze the messages received through the bus connector to determine whether the messages should be transmitted to a diagnostic system, the determination based on predetermined criteria set by the diagnostic system, and
receive the messages destined for communication through the bus connector; and
a wireless communication device coupled to the computer, the wireless communication device, using a wireless link, operable to transmit the messages that should be transmitted and receive the messages destined for communication through the bus connector.

2. The system of claim 1, wherein the computer is further operable to:
format the messages to be transmitted for communication to the wireless communication device, and
format the messages destined for communication through the bus connector for the protocol transceiver.

3. The system of claim 1, wherein the computer examines the destination address of the messages to determine whether the messages satisfy predetermined criteria.

4. The system of claim 1, wherein the computer has a plurality of predetermined criteria sets.

5. The system of claim 1, wherein the computer is further operable to analyze the messages destined for communication through the bus connector to determine whether they should be sent through the bus connector.

6. The system of claim 1, wherein:
the wireless communication device is further operable to receive messages destined for the computer; and
the computer is further operable to determine if the messages are destined for it.

7. The system of claim 6, wherein at least some of the messages destined for the computer specify criteria for determining whether messages received through the bus connector should be transmitted.

8. The system of claim 1, further comprising a second protocol transceiver coupled to the bus connector and the computer, the second protocol transceiver operable to:
receive messages destined for communication through the bus connector and send the messages through the bus connector according to a second vehicle bus protocol; and
receive messages through the bus connector according to the second vehicle bus protocol.

9. The system of claim 8, wherein the computer is further operable to select, for a message destined for communication through the bus connector, which of the protocol transceivers will send the message.

10. The system of claim 8, wherein the first protocol transceiver is operable to send and receive messages through the bus connector according to J1939 and the second protocol transceiver is operable to send and receive messages through the bus connector according to J1587.

11. The system of claim 1, wherein the computer comprises a memory operable to store messages received through the bus connector for transmission upon the establishment of a wireless link.

12. The system of claim 1, wherein the computer comprises a memory operable to store information about an associated vehicle.

13. The system of claim 12, wherein the information comprises the vehicle identification number.

14. The system of claim 1, wherein the computer is further operable to perform the operations of a node on a vehicle bus.

15. The system of claim 1, wherein the bus connector comprises an assembly line diagnostic link connector having sixteen pins.

16. The system of claim 1, wherein the computer is further operable to manage messages to be transmitted over the wireless link.

17. The system of claim 16, wherein the computer is operable to store a message in a buffer, determine whether a sufficient amount of such messages are present in the buffer, and transmit the messages if a sufficient amount of messages are present to manage messages to be transmitted over the wireless link.

18. The system of claim 1, wherein the wireless communication device is a high-speed, short-range wireless communication device.

* * * * *